US009797711B2

(12) United States Patent
Takai et al.

(10) Patent No.: US 9,797,711 B2
(45) Date of Patent: Oct. 24, 2017

(54) SIGNAL PROCESSING DEVICE OF SCANNING-TYPE DISTANCE MEASUREMENT DEVICE, SIGNAL PROCESSING METHOD, AND SCANNING-TYPE DISTANCE MEASUREMENT DEVICE

(75) Inventors: Kazuo Takai, Settsu (JP); Tsuyoshi Hosoda, Osaka (JP)

(73) Assignee: HOKUYO AUTOMATIC CO., LTD., Osaka (JP)

( * ) Notice: Subject to any disclaimer, the term of this patent is extended or adjusted under 35 U.S.C. 154(b) by 1054 days.

(21) Appl. No.: 14/003,336

(22) PCT Filed: Mar. 24, 2011

(86) PCT No.: PCT/JP2011/057079
§ 371 (c)(1),
(2), (4) Date: Sep. 5, 2013

(87) PCT Pub. No.: WO2012/127671
PCT Pub. Date: Sep. 27, 2012

(65) Prior Publication Data
US 2013/0346019 A1    Dec. 26, 2013

(51) Int. Cl.
*G01C 21/16*    (2006.01)
*G01B 11/14*    (2006.01)
(Continued)

(52) U.S. Cl.
CPC ............ *G01B 11/14* (2013.01); *G01S 7/4817* (2013.01); *G01S 17/42* (2013.01); *G01S 17/026* (2013.01)

(58) Field of Classification Search
CPC ....................................................... G01B 11/14
See application file for complete search history.

(56) References Cited

FOREIGN PATENT DOCUMENTS

| EP | 1 826 585 A2 | 8/2007 |
|---|---|---|
| EP | 2 053 427 A1 | 4/2009 |

(Continued)

OTHER PUBLICATIONS

Feb. 3, 2015 Office Action issued in Japanese Patent Application No. 2013-505738.
(Continued)

*Primary Examiner* — Phuong Huynh
(74) *Attorney, Agent, or Firm* — Oliff PLC

(57) ABSTRACT

A signal processing device of a scanning-type distance measurement device includes: a distance calculation unit for, on the basis of a predetermined correlation relationship between measured light and reflection light, calculating, for each predetermined scan angle, the distance from the scanning-type distance measurement device to an object; a to-be-monitored object determination unit for performing a to-be-monitored object determination process, in which, when the distance calculation unit calculates a distance within a to-be-monitored region for N number of scans (N is an integer equal to or greater than 2) consecutively in a specific scan angle direction, it is determined that there is an object to be monitored in the specific scan angle direction; and a signal output unit which, when it is determined by the to-be-monitored object determination unit that there is an object to be monitored, outputs a to-be-monitored object detection signal.

13 Claims, 13 Drawing Sheets

(51) Int. Cl.
    *G01S 17/42*    (2006.01)
    *G01S 7/481*    (2006.01)
    G06F 11/30      (2006.01)
    G01S 17/02      (2006.01)

(56) References Cited

FOREIGN PATENT DOCUMENTS

| | | | |
|---|---|---|---|
| EP | 2053427 | * | 4/2009 |
| JP | A 63-79010 | | 4/1988 |
| JP | A 6-148329 | | 5/1994 |
| JP | A 7-140247 | | 6/1995 |
| JP | H11-231052 A | | 8/1999 |
| JP | 2000-275344 A | | 10/2000 |
| JP | A 2002-90454 | | 3/2002 |
| JP | 2007-278743 A | | 10/2007 |
| JP | A 2007-256191 | | 10/2007 |
| JP | A 2008-26239 | | 2/2008 |
| JP | A 2008-224234 | | 9/2008 |
| JP | A 2008-224621 | | 9/2008 |
| JP | 2009-110069 A | | 5/2009 |
| JP | 2010-175488 A | | 8/2010 |

OTHER PUBLICATIONS

Jul. 28, 2014 Search Report issued in European Patent Application No. 11861389.2.
Apr. 19, 2011 Search Report issued in International Patent Application No. PCT/JP2011/057079 (with translation).

* cited by examiner

US 9,797,711 B2

SIGNAL PROCESSING DEVICE OF SCANNING-TYPE DISTANCE MEASUREMENT DEVICE, SIGNAL PROCESSING METHOD, AND SCANNING-TYPE DISTANCE MEASUREMENT DEVICE

This application is the U.S. national phase of international application PCT/JP2011/057079, filed on Mar. 24, 2011, which designated the U.S. and claims no priority. The entire contents of these applications are incorporated herein by reference.

TECHNICAL FIELD

The present invention relates to a signal processing device of a scanning-type distance measurement device, a signal processing method, and a scanning-type distance measurement device, repetitively scanning a to-be-monitored region with use of measurement light at predetermined scan cycles to detect reflected light from an object with respect to the measurement light at each predetermined scan angle.

BACKGROUND ART

A scanning-type distance measurement device adopts at least one of the time of flight (TOF) system or the amplitude modulation (AM) system, and is used in a visual sensor of a robot or an automatic guided vehicle, an open/close sensor of a door, a monitor sensor for detecting whether or not there is an invader into a to-be-monitored region, a safety sensor for detecting a person or an object approaching a dangerous machine so as to safely stop the machine, or the like.

As disclosed in Patent Document 1, the TOF system includes calculating a distance D from a scanning-type distance measurement device to an object located in a to-be-monitored region in accordance with a detection time difference Δt between pulse-shaped measurement light emitted to the to-be-monitored region and reflected light from the object with respect to the measurement light. The distance D is calculated in accordance with the following numerical expression. In this equation, C denotes light speed.

$D = \Delta t \cdot C / 2$

As disclosed in Patent Document 2, the AM system includes calculating a distance D from a scanning-type distance measurement device to an object located in a to-be-monitored region in accordance with a phase difference Δϕ between measurement light that is modulated in amplitude and emitted to the to-be-monitored region and reflected light from the object with respect to the measurement light. The distance D is calculated in accordance with the following numerical expression. In this equation, C denotes light speed and f denotes a modulation frequency.

$D = \Delta\phi \cdot C / (4\pi \cdot f)$

There is also proposed a scanning-type distance measurement device of the burst modulation system that includes both of the TOF system and the AM system. According to the burst modulation system, measurement light modulated in amplitude is emitted into a pulse shape, and a distance equal to or longer than one wavelength of the amplitude modulated light is calculated in accordance with the TOF system whereas a distance shorter than one wavelength of the amplitude modulated light is calculated in accordance with the AM system.

In any of these cases, a signal processing device of a scanning-type distance measurement device includes a distance calculation unit for calculating a distance from the scanning-type distance measurement device to an object located in a to-be-monitored region at each predetermined scan angle in accordance with a predetermined correlation relationship between measurement light and reflected light, more specifically, a correlation relationship between delay time or a phase difference therebetween and the distance.

Patent Document 3 discloses a scanning-type distance measurement device that includes an object detection means including a reception signal integration means for integrating reception signals corresponding to reflected light in each of a predetermined number of regions obtained by dividing a scan range to be scanned with use of measurement light and generating region measurement data, a region measurement data storage memory for storing the region measurement data for each of the regions, a chronological process means for chronologically filtering the region measurement data read out of the region measurement data storage memory, and an object detector for detecting an object in accordance with, in the region measurement data chronologically filtered by the chronological process means, data that has a first peak value at a current scan not being decreased by a predetermined constant or greater value from a second peak value at a last scan measurement in the same region, and excluding, from object detection targets, data that has the first peak value being decreased by the predetermined constant or greater value from the second peak value.

PRIOR ART DOCUMENTS

Patent Documents

[Patent Document 1] JP 2007-256191 A
[Patent Document 2] JP 2002-90454 A
[Patent Document 3] JP 2008-224621 A

SUMMARY OF INVENTION

Problems to be Solved by the Invention

It is, however, uneasy to correctly determine whether or not there is a to-be-monitored object in a to-be-monitored region in accordance with reflected light from an object detected by such a scanning-type distance measurement device. This may lead to erroneous detection.

For example, there have been a case of erroneously recognizing reflected light from tiny dust floating in the to-be-monitored region or from a tiny insect flying around in the to-be-monitored region as reflected light from the to-be-monitored object, and a case of erroneously recognizing measurement light from another scanning-type distance measurement device located in the to-be-monitored region as reflected light from the to-be-monitored object.

When the to-be-monitored region is defined outdoors, there has been also a case of erroneously recognizing reflected light from a leaf of a tree, a raindrop, or the like as reflected light from the to-be-monitored object.

When the scanning-type distance measurement device is used as a safety sensor, such erroneous detection causes a disadvantageous situation where a machine is automatically stopped for safety reason in accordance with a to-be-monitored object detection signal outputted from the scanning-type distance measurement device.

In view of the problems mentioned above, it is an object of the present invention to provide a signal processing device of a scanning-type distance measurement device, a signal processing method, and a scanning-type distance measurement device, which enable correct recognition whether or not reflected light from an object comes from a to-be-monitored object that is actually to be detected.

Means for Solving the Problems

In order to achieve the object mentioned above, as recited in claim 1 of the claims document, as a first characteristic configuration of a signal processing device of a scanning-type distance measurement device according to the present invention, a signal processing device of a scanning-type distance measurement device repetitively scanning a to-be-monitored region with use of measurement light at predetermined scan cycles to detect reflected light from an object with respect to the measurement light at each predetermined scan angle, the signal processing device includes: a distance calculation unit configured to calculate a distance from the scanning-type distance measurement device to the object at the each predetermined scan angle in accordance with a predetermined correlation relationship between measurement light and reflected light; a to-be-monitored object determination unit configured to perform a to-be-monitored object determination process of determining that there is a to-be-monitored object in a specific scan angle direction when the distance calculation unit calculates a distance within the to-be-monitored region consecutively for N number of scans (N is an integer equal to or greater than two) in the specific scan angle direction; and a signal output unit configured to output a to-be-monitored object detection signal when the to-be-monitored object determination unit determines that there is the to-be-monitored object.

When the distance calculation unit calculates a distance at a certain scan angle at a certain scan in accordance with measurement light used for scanning the to-be-monitored region, it is clarified that there is a certain object in a corresponding scan angle direction.

If the object is tiny dust, a tiny insect, or a raindrop, there is an extremely low probability of consecutively calculating a distance at the same scan angle at a subsequent scan. A common target required to be detected as a to-be-monitored object travels at speed lower than that of tiny dust or a tiny insect and is larger in size, e.g. a human being or a carrier vehicle. Tiny dust or a tiny insect travels much faster or is smaller than the to-be-monitored object, so as to travel from a specific scan angle direction to a different scan angle direction before a subsequent scan cycle starts. A raindrop falls before a subsequent scan cycle starts.

The to-be-monitored object determination unit determines that there is the to-be-monitored object only when the distance calculation unit calculates a distance indicating a position within the to-be-monitored region consecutively for the N number of scans in the specific scan angle direction. It is thus possible to correctly determine presence of the to-be-monitored object by eliminating erroneous detection due to an object travelling faster or much smaller than the to-be-monitored object as an actual detection target, measurement light from a different scanning-type distance measurement device, or the like. The number of scans N is an integer equal to or greater than two and a value set appropriately.

As recited in claim 2, in addition to the first characteristic configuration described above, a second characteristic configuration lies in that the to-be-monitored object determination unit calculates a difference between distances calculated by the distance calculation unit for two consecutive scans in the specific scan angle direction, and performs the to-be-monitored object determination process when the calculated value is smaller than a predetermined threshold.

If it is readily determined that there is the to-be-monitored object when the distance calculation unit calculates a distance consecutively for the N number of scans in the specific scan angle direction, erroneous determination may be made in a case where an object is accidentally detected on a far side of the specific scan angle direction in a certain scan cycle and a different object is detected on a close side of the specific scan angle direction in a subsequent scan cycle.

When a difference between distances calculated consecutively for the N number of scans in the specific scan angle direction is smaller than the predetermined threshold, these distances are regarded as being calculated in accordance with reflected light from an identical object and it is determined that the object corresponds to the to-be-monitored object. This appropriately eliminates erroneous determination.

As recited in claim 3, in addition to the first or second characteristic configuration described above, a third characteristic configuration lies in that, when there are M number of adjacent specific scan angle directions (M is an integer equal to or greater than two) in which a distance within the to-be-monitored region is calculated by the distance calculation unit consecutively for the N number of scans, the to-be-monitored object determination unit determines in the to-be-monitored object determination process that there is the to-be-monitored object in the specific scan angle directions.

If a target required to be detected as a to-be-monitored object is an object of a constant size such as a human being or a carrier vehicle, the distance calculation unit will calculate a distance in a plurality of adjacent scan angle directions. In the above configuration, when there are the M number of adjacent specific scan angle directions in which a distance within the to-be-monitored region is calculated consecutively for the N number of scans, it is determined that there is the to-be-monitored object in these specific scan angle directions. This appropriately avoids erroneously detecting an object having a small size and staying still in the to-be-monitored region as the to-be-monitored object. The number of adjacent specific scan angle directions M is an integer equal to or greater than two and a value set appropriately.

As recited in claim 4, in addition to the third characteristic configuration described above, a fourth characteristic configuration lies in that, at the N-th scan where the distance calculation unit calculates a distance within the to-be-monitored region consecutively for the N number of scans in the specific scan angle direction, when a distance within the to-be-monitored region is calculated in the M number of adjacent scan angle directions including the specific scan angle direction and a distance within the to-be-monitored region is not calculated consecutively for the N number of scans in at least one of the M number of scan angle directions, the to-be-monitored object determination unit regards that a distance within the to-be-monitored region is calculated consecutively for the N number of scans in the scan angle direction at the scan and performs the to-be-monitored object determination process.

In connection with the third characteristic configuration described above, at the N-th scan where the distance calculation unit calculates a distance within the to-be-monitored region consecutively for the N number of scans in one specific scan angle direction in a certain scan cycle, even when a distance within the to-be-monitored region is calculated in the M number of adjacent scan angle directions including the specific scan angle direction, there is a case where a distance within the to-be-monitored region is calculated for a number of times less than the N number of times in at least one of the M number of scan angle directions. Such a phenomenon occurs when an object travels substantially parallel to the scan direction. In this case, the size in the scan direction of the object is reduced in appearance. In this case, the to-be-monitored object determination unit disadvantageously fails to determine that there is the to-be-monitored object although the to-be-monitored object is located in the specific scan angle direction.

In view of this case, even though a distance is not calculated consecutively for the N number of scans in all the M number of adjacent scan angle directions, when a distance is calculated consecutively for the N number of scans in the specific scan angle direction, the to-be-monitored object determination unit regards that a distance is calculated consecutively for the N number of scans in the M number of scan angle directions so as to determine that there is the to-be-monitored object in the specific scan angle direction. This preliminarily avoids a situation where a travelling to-be-monitored object disappears halfway.

As recited in claim 5, in addition to the third characteristic configuration described above, a fifth characteristic configuration lies in that, at the N-th scan where the distance calculation unit calculates a distance within the to-be-monitored region consecutively for the N number of scans in the specific scan angle direction, when a distance within the to-be-monitored region is not calculated and a distance within the to-be-monitored region has been calculated at a last scan in at least one of the M number of adjacent scan angle directions including the specific scan angle direction, the to-be-monitored object determination unit regards that a distance within the to-be-monitored region is calculated in the scan angle direction at the scan and performs the to-be-monitored object determination process.

In connection with the third characteristic configuration described above, at the N-th scan where the distance calculation unit calculates a distance within the to-be-monitored region consecutively for the N number of scans in one specific scan angle direction in a certain scan cycle, also when a distance within the to-be-monitored region is not calculated in at least one of the M number of adjacent scan angle directions including this scan angle direction, there is a disadvantageous situation where the to-be-monitored object determination unit fails to determine that there is the to-be-monitored object although the to-be-monitored object is located in the specific scan angle direction.

In view of the case, when the distance is calculated at the last scan in the M number of scan angle directions, the to-be-monitored object determination unit regards that a distance is calculated in the M number of scan angle directions again this time so as to determine that there is the to-be-monitored object in the specific scan angle direction.

As recited in claim 6, a sixth characteristic configuration lies in a signal processing device of a scanning-type distance measurement device repetitively scanning a to-be-monitored region with use of measurement light at predetermined scan cycles to detect reflected light from an object with respect to the measurement light at each predetermined scan angle, the signal processing device including: a distance calculation unit configured to calculate a distance from the scanning-type distance measurement device to the object at the each predetermined scan angle in accordance with a predetermined correlation relationship between measurement light and reflected light; a to-be-monitored object determination unit configured to perform a to-be-monitored object determination process of determining that there is a to-be-monitored object in M number of adjacent scan angle directions (M is an integer equal to or greater than two) when the distance calculation unit calculates a distance within the to-be-monitored region in the M number of scan angle directions and calculates a distance within the to-be-monitored region consecutively for N number of scans (N is an integer equal to or greater than two) in the M number of scan angle directions; and a signal output unit configured to output a to-be-monitored object detection signal when the to-be-monitored object determination unit determines that there is the to-be-monitored object.

In the above configuration, when a distance within the to-be-monitored region is calculated in the M number of adjacent scan angle directions, it is initially determined that there is possibly the to-be-monitored object. This excludes a tiny object not covering the M number of scan angle directions. When a distance within the to-be-monitored region is calculated consecutively for the N number of scans in the M number of scan angle directions, it is then determined that there is the to-be-monitored object in the M number of scan angle directions.

As recited in claim 7, in addition to any one of the first to sixth characteristic configurations described above, a seventh characteristic configuration lies in that the number of scans N is set to a different value depending on a distance calculated by the distance calculation unit or a size of the to-be-monitored object.

When a movable object has a constant size, a shorter distance from the scanning-type distance measurement device to the object is calculated consecutively in a specific scan angle direction at a higher probability, whereas a longer distance from the scanning-type distance measurement device to the object is calculated consecutively in the specific scan angle direction at a lower probability. If the number of scans N is set to a different value depending on a distance to an object calculated by the distance calculation unit or the size of the to-be-monitored object, it is possible to accurately detect both an object located far from the scanning-type distance measurement device and an object located close to the scanning-type distance measurement device in accordance with the sizes thereof.

As recited in claim 8, in addition to any one of the third to sixth characteristic configurations described above, an eighth characteristic configuration lies in that the number of adjacent scan angle directions M is set to a different value depending on a distance calculated by the distance calculation unit.

When a movable object has a constant size, a shorter distance from the scanning-type distance measurement device to the object is calculated in a larger number of adjacent scan angle directions in which a distance is calculated in a scan cycle same as a scan cycle where a distance is calculated in a specific scan angle direction, whereas a longer distance from the scanning-type distance measurement device to the object is calculated in a smaller number of adjacent scan angle directions in which a distance is calculated in a scan cycle same as the scan cycle where a distance is calculated in the specific scan angle direction. If the number of adjacent scan angle directions M is set to a different value depending on a distance to the object calculated by the distance calculation unit or the size of the to-be-monitored object, it is possible to accurately detect both an object located far from the scanning-type distance measurement device and an object located close to the scanning-type distance measurement device in accordance with the sizes of the objects thereof.

As recited in claim 9, a characteristic configuration of a scanning-type distance measurement device according to the present invention lies in including the signal processing device of a scanning-type distance measurement device, having any one of the first to eighth characteristic configurations described above. It is thus possible to achieve the scanning-type distance measurement device capable of appropriately detecting a to-be-monitored object that is actually to be detected.

As recited in claim 10, as a first characteristic configuration of a signal processing method for a scanning-type distance measurement device according to the present invention, a signal processing method for a scanning-type distance measurement device repetitively scanning a to-be-monitored region with use of measurement light at predetermined scan cycles to detect reflected light from an object with respect to the measurement light at each predetermined scan angle, the signal processing method includes: a distance calculation step of calculating a distance from the scanning-type distance measurement device to the object at the each predetermined scan angle in accordance with a predetermined correlation relationship between measurement light and reflected light; a to-be-monitored object determination step of performing a to-be-monitored object determination process of determining that there is a to-be-monitored object in a specific scan angle direction when a distance within the to-be-monitored region is calculated consecutively for N number of scans (N is an integer equal to or greater than two) in the specific scan angle direction in the distance calculation step; and a signal output step of outputting a to-be-monitored object detection signal when the to-be-monitored object determination unit determines that there is the to-be-monitored object.

As recited in claim 11, in addition to the first characteristic configuration described above, a second characteristic configuration lies in that the to-be-monitored object determination step includes performing the to-be-monitored object determination process when a difference between distances calculated in the distance calculation step for two consecutive scans in the specific scan angle direction is smaller than a predetermined threshold.

As recited in claim 12, in addition to the first or second characteristic configuration described above, a third characteristic configuration lies in that, when there are M number of adjacent specific scan angle directions (M is an integer equal to or greater than two) in which a distance within the to-be-monitored region is calculated in the distance calculation step consecutively for the N number of scans, the to-be-monitored object determination step includes the to-be-monitored object determination process of determining that there is the to-be-monitored object in the specific scan angle directions.

As recited in claim 13, in addition to the third characteristic configuration described above, a fourth characteristic configuration lies in that, at the N-th scan where a distance within the to-be-monitored region is calculated in the distance calculation step consecutively for the N number of scans in the specific scan angle direction, when a distance within the to-be-monitored region is calculated in the M number of adjacent scan angle directions including the specific scan angle direction and a distance within the to-be-monitored region is not calculated consecutively for the N number of scans in at least one of the M number of scan angle directions, the to-be-monitored object determination step includes regarding that a distance within the to-be-monitored region is calculated consecutively for the N number of scans in the scan angle direction at the scan and performing the to-be-monitored object determination process.

As recited in claim 14, in addition to the third characteristic configuration described above, a fifth characteristic configuration lies in that, at the N-th scan where a distance within the to-be-monitored region is calculated in the distance calculation step consecutively for the N number of scans in the specific scan angle direction, when a distance within the to-be-monitored region is not calculated in at least one of the M number of adjacent scan angle directions including the specific scan angle direction and a distance within the to-be-monitored region is calculated at a last scan, the to-be-monitored object determination step includes regarding that a distance within the to-be-monitored region is calculated in the scan angle direction at the scan and performing the to-be-monitored object determination process.

As recited in claim 15, a sixth characteristic configuration lies in a signal processing method for a scanning-type distance measurement device repetitively scanning a to-be-monitored region with use of measurement light at predetermined scan cycles to detect reflected light from an object with respect to the measurement light at each predetermined scan angle, the signal processing method including: a distance calculation step of calculating a distance from the scanning-type distance measurement device to the object at the each predetermined scan angle in accordance with a predetermined correlation relationship between measurement light and reflected light; a to-be-monitored object determination step of performing a to-be-monitored object determination process of determining that there is a to-be-monitored object in M number of adjacent scan angle directions (M is an integer equal to or greater than two) when a distance within the to-be-monitored region is calculated in the M number of scan angle directions and a distance within the to-be-monitored region is calculated consecutively for N number of scans (N is an integer equal to or greater than two) in the M number of scan angle directions in the distance calculation step; and a signal output step of outputting a to-be-monitored object detection signal when it is determined that there is the to-be-monitored object in the to-be-monitored object determination step.

Effects of Invention

As described above, the present invention achieves provision of a signal processing device of a scanning-type distance measurement device, a signal processing method, and a scanning-type distance measurement device, which enable correct recognition whether or not reflected light from an object comes from a to-be-monitored object that is actually to be detected.

EMBODIMENTS FOR CARRYING OUT THE INVENTION

Described below with reference to the drawings are a signal processing device of a scanning-type distance measurement device, a signal processing method, and a scanning-type distance measurement device according to the present invention. Described in the following example is a scanning-type distance measurement device that serves as a safety sensor and includes an infrared semiconductor laser as a light source of measurement light and a signal processing device provided with a distance calculation unit for calculating a distance to an object in accordance with the TOF system, and the like. When the scanning-type distance measurement device detects a to-be-monitored object such as an invader in a predetermined to-be-monitored region, a signal indicating the detection is transmitted to an external device. The external device stops a machine for safety reason or the like, in accordance with the signal.

The present invention is also applicable to a scanning-type distance measurement device that includes a laser of any type other than a semiconductor laser as a light source, or a light source of any other type such as an LED. The present invention is further applicable to a distance calculation unit that adopts, as a distance calculation system, any system other than the TOF system, such as the AM system or the burst modulation system combining both of the TOF system and the AM system.

Figure 1:
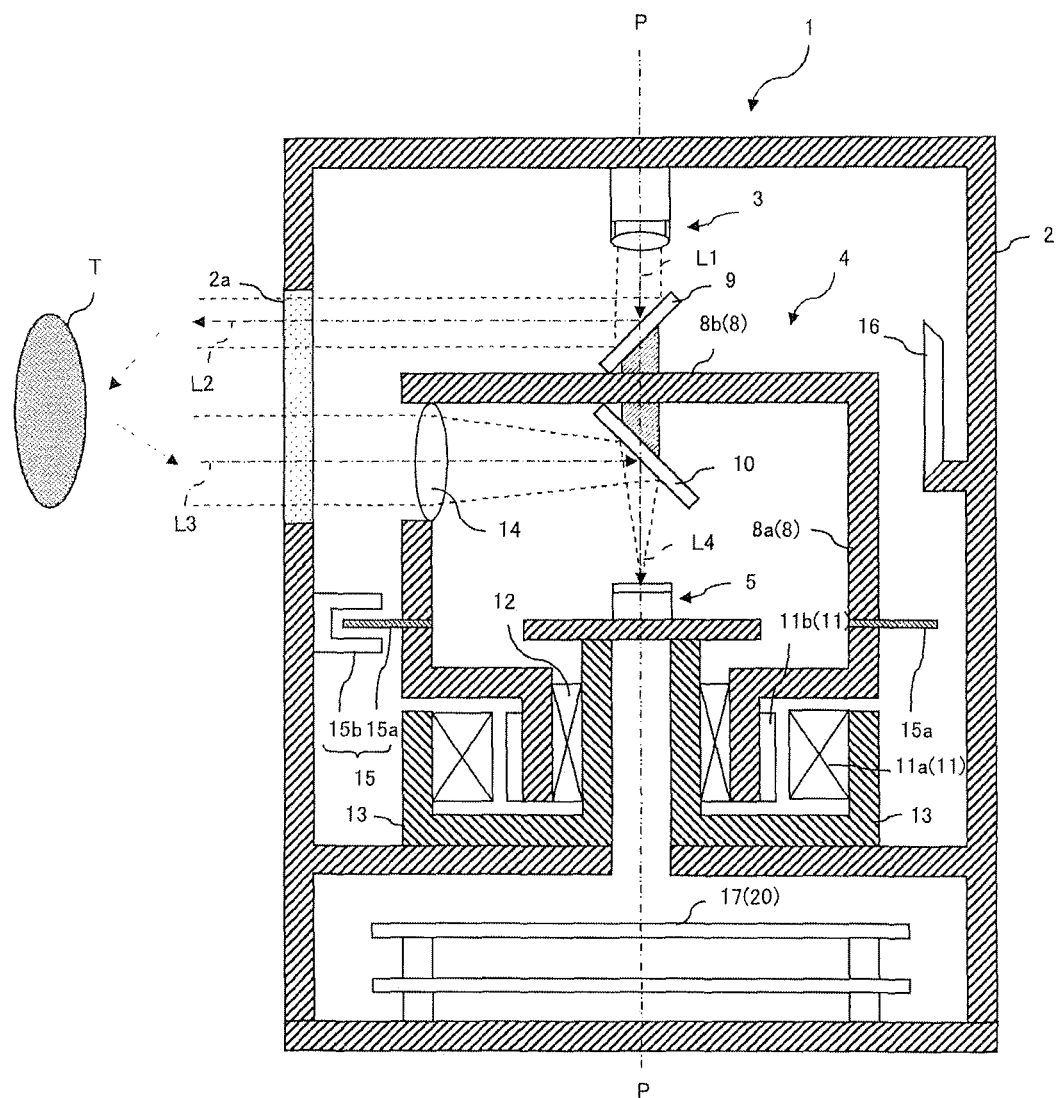
FIG. 1 is a schematic longitudinal sectional view showing an entire configuration of a scanning-type distance measurement device according to the present invention.

FIG. 1 exemplifies a scanning-type distance measurement device of this type. A scanning-type distance measurement device 1 includes a cylindrical casing 2 accommodating a light emission unit 3 and a light reception unit 5 in a pair, a circular arc optical window 2a located along the circumferential direction of the casing 2, a first deflecting mirror 9 for deflecting and reflecting measurement light output from the light emission unit 3 into a direction perpendicular to an axis P of the cylindrical casing, a second deflecting mirror 10 for deflecting and reflecting reflected light from a to-be-measured object T to the light reception unit 5, and a deflection optical system 4 for rotating the first deflecting mirror 9 and the second deflecting mirror 10 about the axis P so as to rotary scan the measurement light on a plane perpendicular to the axis P.

The casing 2 has an inner wall surface covered with a light absorbing member, such as a blackout curtain, which absorbs stray light. The deflection optical system 4 is located between the light emission unit 3 and the light reception unit 5 that are located opposite to each other along the axis P.

The light emission unit 3 includes a light emitting element configured by an infrared semiconductor laser and an optical lens for parallelizing beams of light output from the light emitting element, and is fixed to an inner surface of an upper wall of the casing 2.

The light reception unit 5 includes a light receiving element configured by an avalanche photodiode for detecting reflected light, and is fixed onto a support plate on a hollow shaft 13 that is fixed to the casing 2.

The deflection optical system 4 includes a cylindrical rotator 8, and a motor 11 for driving to rotate the rotator 8 in a direction. The rotator 8 includes a top panel 8b to which the first deflecting mirror 9 and the second deflecting mirror 10 are attached, and a circumferential wall 8a to which a light receiving lens 14 for condensing reflected light to the light reception unit 5 is attached.

The rotator 8 which is radially reduced at the lower end is rotatably supported by the hollow shaft 13 by means of a bearing 12 provided on an inner circumferential surface of the rotator 8, and a magnet 11b serving as a rotor of the motor 11 is attached to an outer circumferential surface of the radially reduced portion. The motor 11 includes the rotor and a stator configured by a coil 11a that is located opposite to the rotor. The stator has a cover attached to the hollow shaft 13 that is fixed to the casing 2.

Measurement light emitted from the light emission unit 3 along an optical axis L1 is deflected by the first deflecting mirror 9 so as to be along an optical axis L2 perpendicular to the optical axis L1, and is applied to a to-be-measured space through the optical window 2a. Reflected light from the to-be-measured object T located in the to-be-measured space enters the light receiving lens 14 through the optical window 2a along an optical axis L3 parallel to the optical axis L2, is deflected by the second deflecting mirror 10 so as to be along an optical axis L4 perpendicular to the optical axis L3, and is then condensed to the light reception unit 5.

Measurement light deflected by the first deflecting mirror 9 passes through an upper region of the optical window 2a, whereas reflected light from the to-be-measured object T passes through a lower region of the optical window 2b.

The deflection optical system 4 is driven to rotate by the motor 11 such that a measurement scan angle region is set to a range in which the to-be-measured space is scanned with use of measurement light through the optical window 2a, more specifically, an angle range of about 270 degrees with reference to the axis P described above, and a nonmeasurement scan angle region is set to an angle region in which measurement light is blocked by the casing 2 and is not emitted to the to-be-measured space.

In other words, the deflection optical system 4 configures a scan unit that periodically deflects and scans the to-be-measured space with use of measurement light emitted from the light emission unit 3 through the optical window 2a.

Attached to the circumferential wall 8a of the rotator 8 is a discoidal slitted plate 15a that is provided with a plurality of slits along the circumferential direction thereof. Attached to an inner wall of the casing 2 is a photointerrupter 15b for detecting the slits. These portions configure a scan angle detection unit 15 for detecting a scan angle of the deflection optical system 4.

The slits in the slitted plate 15a are provided at equal intervals except a reference position where measurement light is applied toward the center of a nonscan angle region. The slits are provided at smaller intervals at the reference position. A rotation angle position of the deflection optical system 4 with respect to the reference position is thus obtained from a pulse width of a pulse transmitted from the scan angle detection unit 15 along rotation of the deflection optical system 4.

The nonscan angle region is provided at the center thereof with a prism 16 as a reference optical system for distance correction. A correction reference distance is obtained by the prism 16 from reflected light detected by the light reception unit 5.

The casing 2 has a bottom portion accommodating a control board 17 that has a signal processing circuit 20 for driving the device and calculating a distance to the to-be-measured object T.

Figure 2:
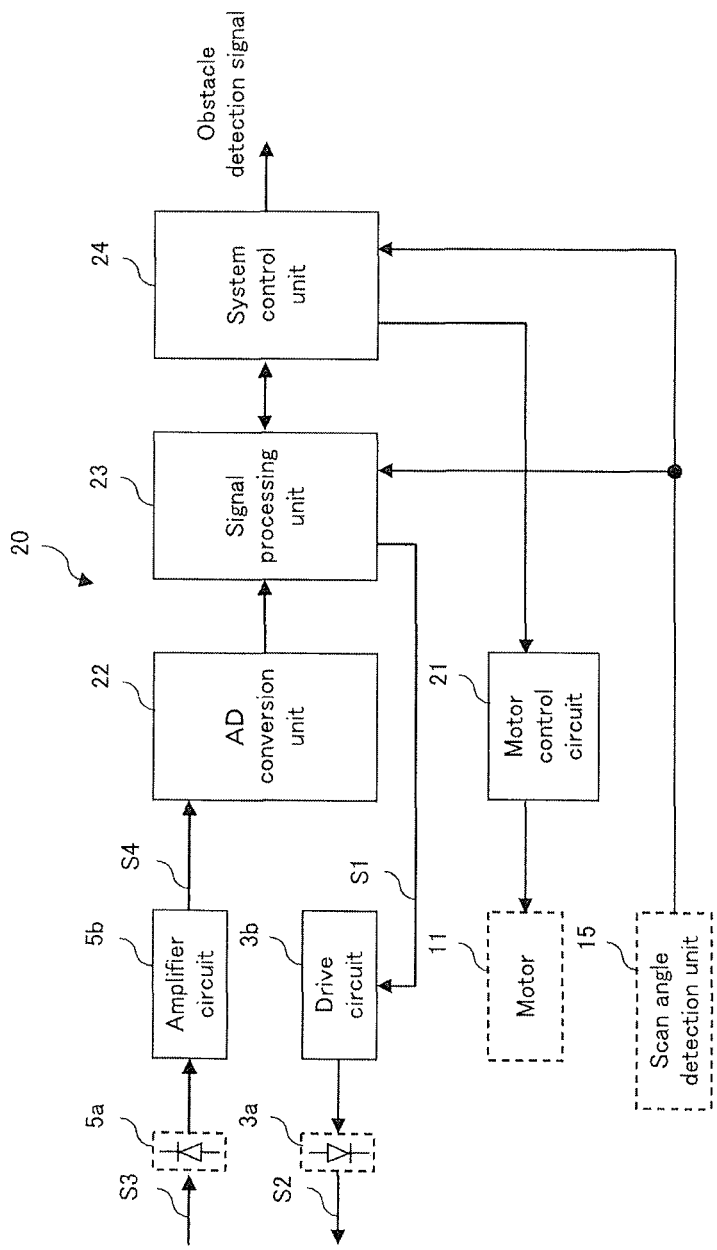
FIG. 2 is a configuration diagram of entire functional blocks such as a signal processing device included in the scanning-type distance measurement device.

As shown in FIG. 2, the signal processing circuit 20 includes a drive circuit 3b for driving a light emitting element 3a, an amplifier circuit 5b for amplifying a reflection signal formed by photoelectrically converting reflected light in a light receiving element 5a, a motor control circuit 21, an AD conversion unit 22, a signal processing unit 23, and a system control unit 24. The signal processing unit 23 and the system control unit 24 configure the signal processing device according to the present invention.

The system control unit 24 is provided with a microcomputer that operates in accordance with a predetermined control program. This microcomputer controls the signal processing unit 23, the motor control circuit 21, and the like.

The system control unit 24 detects a scan angle, in other words, an irradiation angle of measurement light in accordance with an encoder pulse transmitted from the scan angle detection unit 15, and controls the motor control circuit 21 so that the deflection optical system 4 scans the to-be-measured space periodically at predetermined constant speed with use of measurement light.

The system control unit 24 transmits, to the external device connected thereto by way of an interface, a distance transmitted from the signal processing unit 23, measurement information such as a scan angle detected by the scan angle detection unit 15, or a to-be-monitored object detection signal indicating that there is the to-be-monitored object in the to-be-monitored region.

The signal processing device can be accommodated in the casing 2 so as to be integrated with the scanning-type distance measurement device 1. Alternatively, the signal processing device can be located outside the casing 2 so as to be provided separately from the scanning-type distance measurement device 1. In the latter case, the signal processing device is connected, by way of signal wire or a wireless communication unit, to the control board 17 that is provided with the AD conversion unit 22 and the like and accommodated in the casing 2.

The infrared semiconductor laser 3a is pulse driven by a drive pulse signal S1 transmitted from the signal processing unit 23 to the drive circuit 3b in synchronization with an encoder pulse transmitted from the scan angle detection unit 15, so that pulse-shaped measurement light S2 is applied to the to-be-measured space.

This measurement light S2 is applied to the to-be-measured object T, reflected light S3 from the to-be-measured object T is photoelectrically converted by the avalanche photodiode 5a, and a reflection signal S4 amplified by the amplifier circuit 5b is transmitted to the AD conversion unit 22.

The signal processing unit 23 receives a digital reflection signal that is AD converted by the AD conversion unit 22. The signal processing unit 23 obtains a time difference $\Delta t$ between the drive pulse signal S1 and the reflection signal and calculates a tentative distance D1 to the to-be-measured object T in accordance with the following equation.

$$D1 = \Delta t \cdot C/2 \text{ (where } C \text{ denotes light speed.)}$$

The time difference $\Delta t$ indicates delay time of reflected light from measurement light. In the above example, irradiation timing of measurement light is substituted by rising timing of the drive pulse signal S1. Actual rising timing of measurement light can be alternatively detected with use of a photoelectric sensor for detecting measurement light.

When an encoder pulse transmitted from the scan angle detection unit 15 indicates the reference position, measurement light is applied to the prism 16, and a reference distance D2, which corresponds to a time difference $\Delta t'$ based on the reflected light S3 from the prism 16 detected by the avalanche photodiode 5a, is calculated in accordance with the following equation.

$$D2 = \Delta t' \cdot C/2 \text{ (where } C \text{ denotes light speed.)}$$

A distance D to the to-be-measured object is calculated by D1−D2 The reference distance D2 serves as a correction value used for calculation of an accurate distance to the to-be-measured object, by absorption of characteristic variation of the infrared semiconductor laser 3a, the drive circuit 3b, the avalanche photodiode 5a, and the like, which are provided in the scanning-type distance measurement device 1, and variation in measured distance due to a machine difference of the optical system.

In a case of providing a comparator for comparing with predetermined threshold voltage in order to detect rising timing of the reflection signal S4, such rising timing of the reflection signal S4 may not be accurately detected because a rising wave has different inclination depending on strength of the signal so that output timing from the comparator is varied even with the reflection signal S4 generated at same timing.

The signal processing unit 23 thus performs first derivation of the reflection signal S4 and calculates a center of gravity of a positive region of the first derivation reflection signal with reference to rising timing of the first derivation reflection signal, so as to obtain timing corresponding to the center of gravity as detection timing of the reflected light S3.

The signal processing unit 23 is described in detail below.

Figure 3:
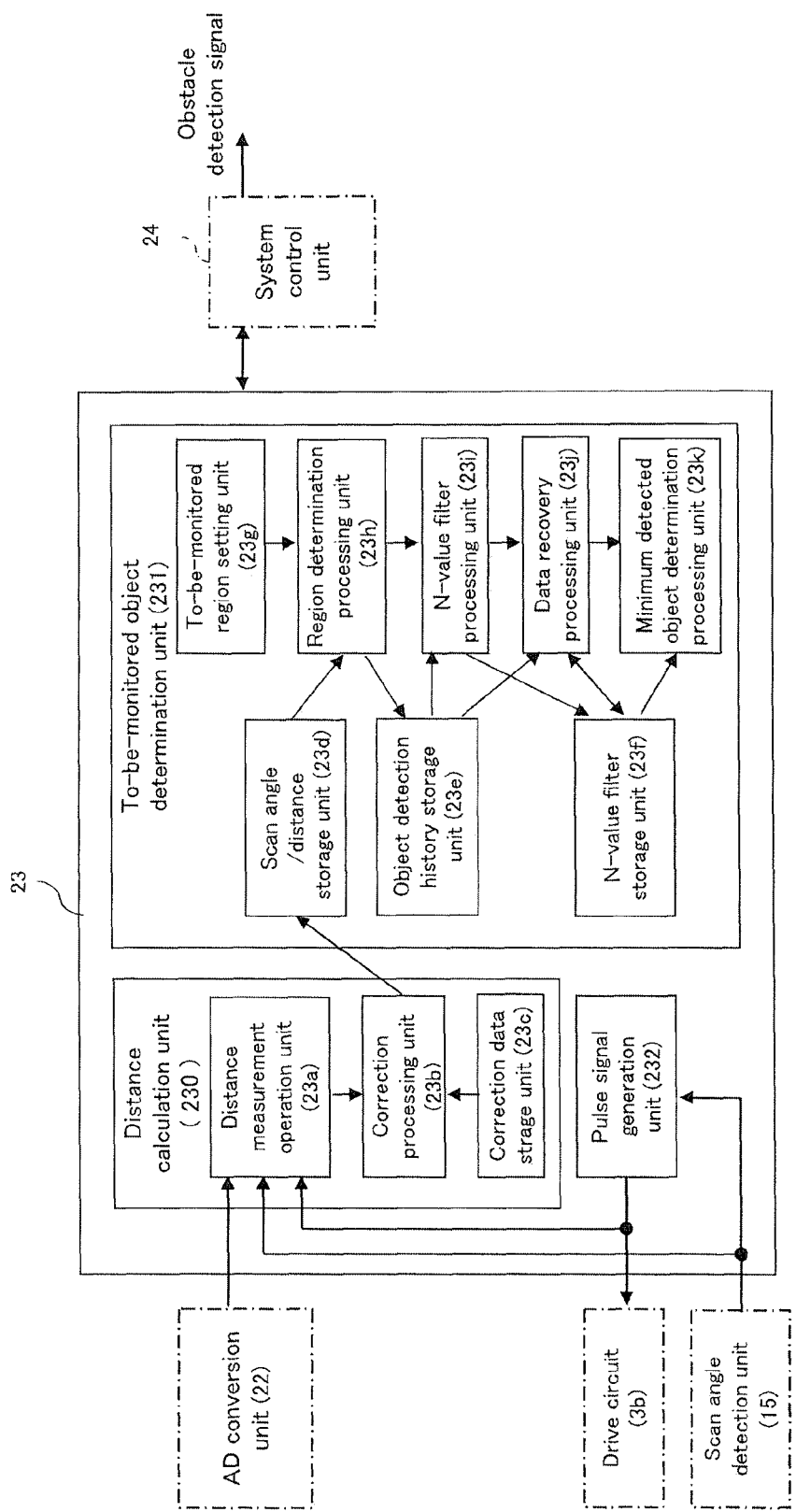
FIG. 3 is a configuration diagram of functional blocks in the signal processing device including a signal processing unit and a system control unit.

As shown in FIG. 3, the signal processing unit 23 is configured by an integrated circuit such as an ASIC including a signal processing gate array and a digital signal processor. The signal processing unit 23 includes a distance calculation unit 230 for calculating the distance D described above to the to-be-measured object, a to-be-monitored object determination unit 231 for determining whether or not there is the to-be-monitored object in accordance with distance information calculated by the distance calculation unit 230 or the like, and a pulse signal generation unit 232 for generating a clock signal that is used for driving the drive circuit 3b, the distance calculation unit 230, and the like.

The distance calculation unit 230 includes a distance measurement operation unit 23a for calculating the distances D1 and D2 described above, a correction data storage unit 23c for storing the correction distance D2 thus calculated, and a correction processing unit 23b for performing the distance correction operation described above.

The distance calculation unit 230 calculates a distance from the scanning-type distance measurement device 1 to an object located in the to-be-monitored region, for each predetermined correlation relationship between measurement light and reflected light at each predetermined scan angle. The predetermined correlation relationship indicates the relationship between delay time of reflected light of measurement light and a distance in the TOF system and indicates the relationship between a phase difference of reflected light of measurement light and a distance in the AM system.

The to-be-monitored object determination unit 231 is provided for determining whether reflected light from an object detected by the scanning-type distance measurement device 1 is noise light reflected from a tiny object such as dust or an insect other than the to-be-monitored object, or signal light reflected from the to-be-monitored object that has entered or invaded into the to-be-monitored region.

If the to-be-monitored object determination unit 231 determines that there is the to-be-monitored object in the to-be-monitored region, a signal indicating the detection is transmitted to the system control unit 24, which transmits a to-be-monitored object detection signal to the external device, that is, the system control unit 24 functions as a signal output unit for transmitting a to-be-monitored object detection signal to outside.

When receiving the to-be-monitored object detection signal from the system control unit 24, the external device performs a predetermined process of controlling to stop a machine located in the to-be-monitored region for safety reason, for example.

Figure 4:
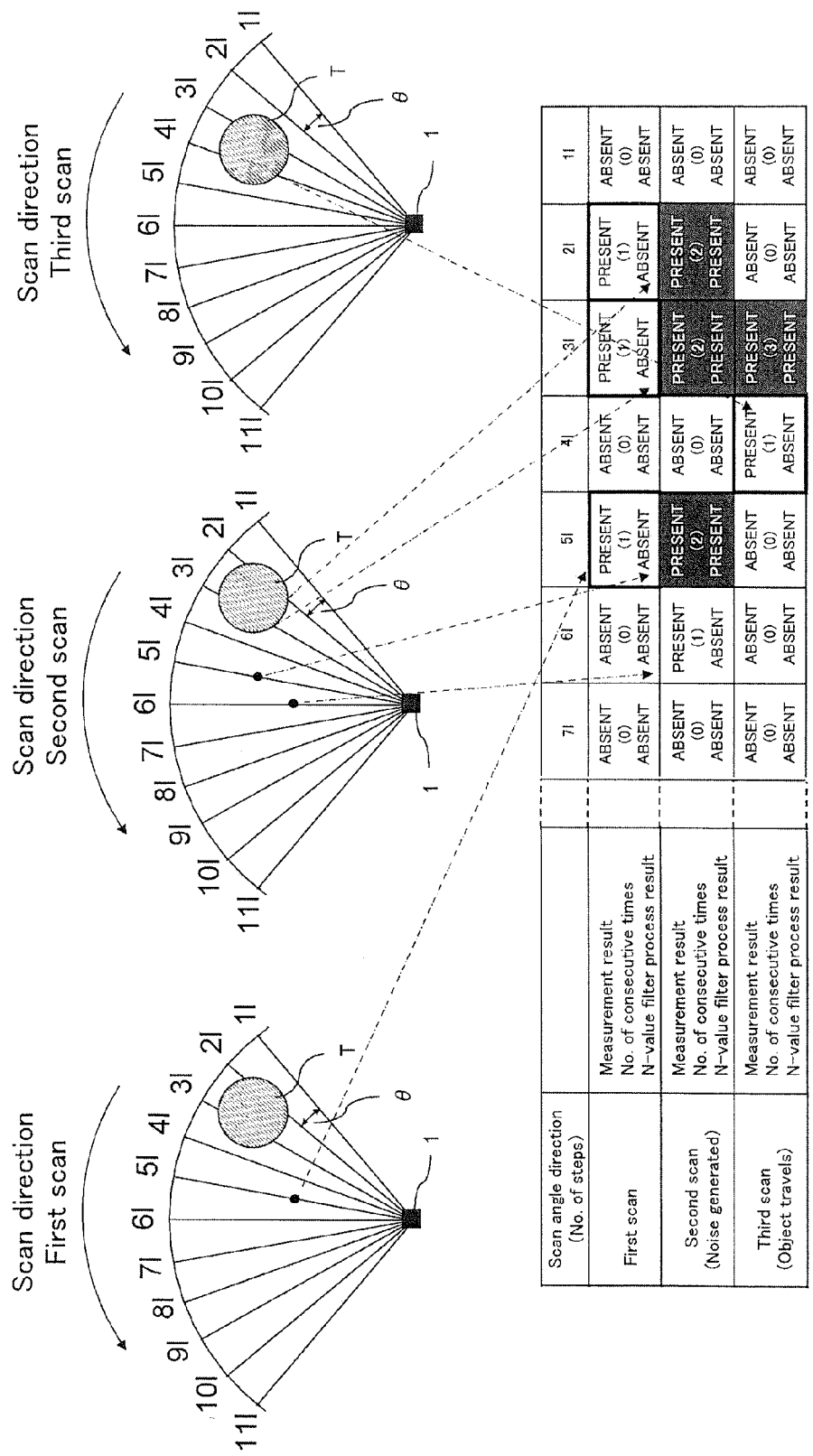
FIG. 4 is an explanatory view showing an object detected by the scanning-type distance measurement device and an obstacle determination process performed by the signal processing device.

FIG. 4 is an explanatory view in a case of detecting a to-be-monitored object of a size as large as a human arm by repetitively scanning, with use of measurement light at the scan cycles of 30 msec., a to-be-monitored region that is set to have a maximum distance of about 10 m from the scanning-type distance measurement device 1 and detecting reflected light from an object with respect to the measurement light at each scan angle θ (=0.25°). In this example, the scan angle θ equal to 0.25° has a width of about 4.36 cm at a position distant by 10 m from the scanning-type distance measurement device 1.

FIG. 4 shows, in the upper section, counterclockwise rotary scan with use of measurement light from the scanning-type distance measurement device 1, a state of a first scan on the left, a state of a second scan in the middle, and a state of a third scan on the right. Reference signs 1l, 2l, 3l, . . . , 10l, and 11l denote scan angle directions (can be alternatively expressed as "steps").

An object T is detected in the scan angle directions 2l and 3l at the first scan. The object T is detected in the scan angle directions 2l and 3l and different objects (indicated by black dots) are detected in the scan angle directions 5l and 6l at the second scan. The object T is detected in the scan angle directions 3l and 4l at the third scan. In this example, the object T indicated by a large circle is a to-be-monitored object, whereas the objects indicated by the small black dots are noise objects such as tiny dirt or a tiny insect.

FIG. 4 shows, in the lower section, a table indicating determination results made by the to-be-monitored object determination unit 231. In this figure, the "determination result" columns each indicate whether or not a distance calculated by the distance calculation unit 230 is within the to-be-monitored region, in other words, whether or not there is an object in the to-be-monitored region, with the expressions of "present"/"absent". The "No. of consecutive times" columns each indicate the number of times of consecutive calculation of a distance within the to-be-monitored region in an identical scan angle direction. The "N-value filter process result" columns each indicate a result of a case where a distance within the to-be-monitored region is calculated for two consecutive times in an identical scan angle direction with the expressions of "present"/"absent".

In a case where the to-be-monitored region is partitioned by a wall or the like, the distance calculation unit 230 will calculate a distance to the wall in every scan angle direction even if there is no object in the to-be-monitored region. That is, when the calculated distance is shorter than the distance from the scanning-type distance measurement device 1 to the wall, it is determined that "there is an object in a specific scan angle direction in the to-be-monitored region".

The to-be-monitored object determination unit 231 thus determines that there is an object in the to-be-monitored region when a distance calculated by the distance calculation unit 230 in the specific scan angle direction is shorter than the distance partitioned in the to-be-monitored region. Such a distance is hereinafter referred to as a distance within the to-be-monitored region.

In this example, the to-be-monitored object determination unit 231 performs a to-be-monitored object determination process of determining that there is the to-be-monitored object in the specific scan angle direction when the distance calculation unit 230 calculates a distance within the to-be-monitored region consecutively for N number of scans in the specific scan angle direction. This condition is referred to as a first condition hereinafter. The number of scans N is an integer equal to or greater than two and a value set appropriately, and is set to N=2 in the present embodiment.

In the example of FIG. 4, the to-be-monitored object determination unit 231 determines whether or not there is the to-be-monitored object under a condition that a noise object such as tiny dirt or a tiny insect is detected consecutively for the N number of times (detected twice in 30 msec. in this example) in an identical scan angle direction at an extremely low probability. This increases accuracy of determination whether or not there is the to-be-monitored object.

Even in this case, a noise object may be detected consecutively for the N number of times at a low probability to result in erroneous detection that the to-be-monitored object is located, as "present" appears in the "N-value filter process result" column of the scan angle direction 5l at the second scan in the table in the lower section of FIG. 4.

Preferably, the to-be-monitored object determination unit 231 further calculates a difference between distances calculated for two consecutive scans in the specific scan angle direction by the distance calculation unit 230 so as to perform the to-be-monitored object determination process when the calculated value is smaller than a predetermined threshold. This condition is referred to as a second condition hereinafter.

The predetermined threshold is set in accordance with the size and travel speed of the to-be-monitored object, so as to be equal to or smaller than a possible travel distance of the to-be-monitored object in the specific scan angle direction in one scan cycle. Even in a case where an object is detected consecutively for the N number of times in an identical scan angle direction, if a distance to the object is varied largely each time, it is determined that different objects are detected and no identical object is detected consecutively.

Moreover, when there are M number of adjacent specific scan angle directions in which the distance calculation unit 230 calculates a distance within the to-be-monitored region consecutively for the N number of scans, the to-be-monitored object determination unit 231 preferably determines in the to-be-monitored object determination process that there is the to-be-monitored object in these specific scan angle directions. This condition is referred to as a third condition hereinafter.

The number of adjacent scan angle directions M is an integer equal to or greater than two and a value set appropriately in accordance with the size of the to-be-monitored object, and is set to M=2 in the present embodiment. That is, it is determined that there is the to-be-monitored object when an object is detected in two adjacent scan angle directions at an identical scan. This avoids erroneous detection of any noise object in a small size within the to-be-monitored region as the to-be-monitored object. It is accordingly possible to avoid erroneously determining that the to-be-monitored object is located in the scan angle direction 5l at the second scan in the table in the lower section of FIG. 4.

In this case again, the to-be-monitored object determination unit 231 preferably calculates a difference between distances calculated for two consecutive scans in the M number of adjacent scan angle directions so as to perform the to-be-monitored object determination process when the calculated value is smaller than the predetermined threshold. This condition is referred to as a fourth condition hereinafter.

On the other hand, the to-be-monitored object may be thinned or disappears when the to-be-monitored object travels in the scan direction of measurement light, as "absent" appears in the "N-value filter process result" column of the scan angle direction 4l at the third scan in the table in the lower section of FIG. 4.

In order to avoid this risk, at the N-th scan where a distance within the to-be-monitored region is calculated consecutively for the N number of scans in a specific scan angle direction, when the distance calculation unit 230 calculates a distance within the to-be-monitored region in the M number of adjacent scan angle directions including the specific scan angle direction and does not calculate a distance within the to-be-monitored region consecutively for the N number of scans in at least one of the M number of scan angle directions, the to-be-monitored object determination unit 231 preferably regards that a distance within the to-be-monitored region is calculated consecutively for the N number of scans in the scan angle direction at this scan to perform the to-be-monitored object determination process. This condition is referred to as a fifth condition hereinafter.

In the table in the lower section of FIG. 4, the distance calculation unit 230 calculates the distance in the scan angle direction 4l at the third scan but does not calculate the distance in the scan angle direction 4l at the second scan. This state does not satisfy the first condition and "absent" appears in the corresponding "N-value filter process result" column. As a result, the third condition is not satisfied and it is determined there is not the to-be-monitored object in the scan angle directions 3l and 4l.

Figure 10:
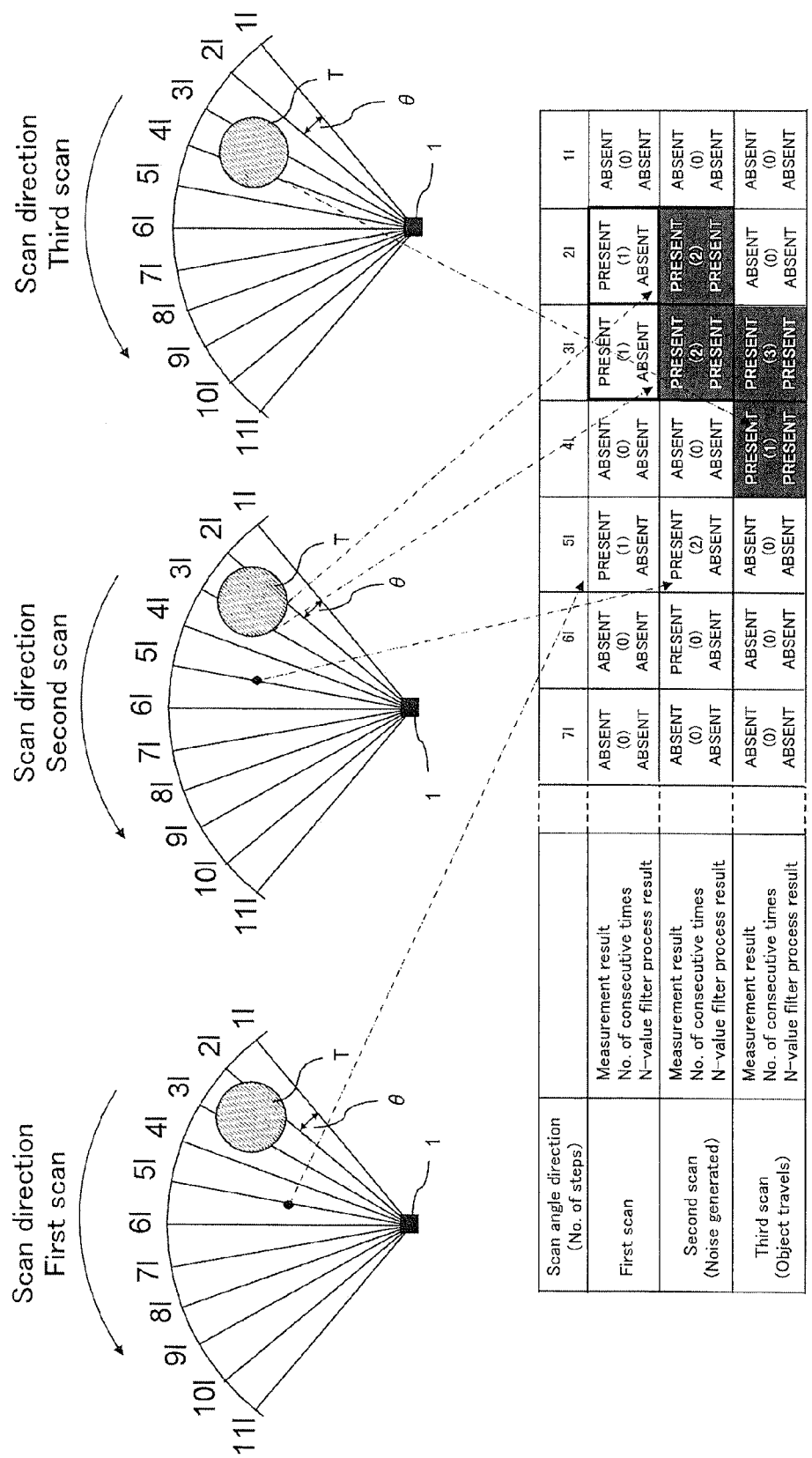
FIG. 10 is an explanatory view according to a different embodiment, showing an object detected by a scanning-type distance measurement device and an obstacle determination process performed by a signal processing device.

However, as shown in FIG. 10, according to the fifth condition, the "N-value filter process result" column of the scan angle direction 4l at the third scan changes from "absent" to "present" so as to satisfy the third condition, and it is thus determined that there is the to-be-monitored object in the scan angle directions 3l and 4l. In other words, the fifth condition corresponds to a process of expanding an object in the scan direction in order to avoid thinning of the object travelling in the scan direction of measurement light.

At the N-th scan where a distance within the to-be-monitored region is calculated consecutively for the N number of scans in a specific scan angle direction, when the distance calculation unit 230 does not calculate a distance within the to-be-monitored region and has calculated a distance within the to-be-monitored region at the last scan in at least one of the M number of adjacent scan angle directions including the specific scan angle direction, the to-be-monitored object determination unit 231 preferably regards that a distance within the to-be-monitored region is calculated in the scan angle direction at this scan to perform the to-be-monitored object determination process. This condition is referred to as a sixth condition hereinafter.

Figure 12:
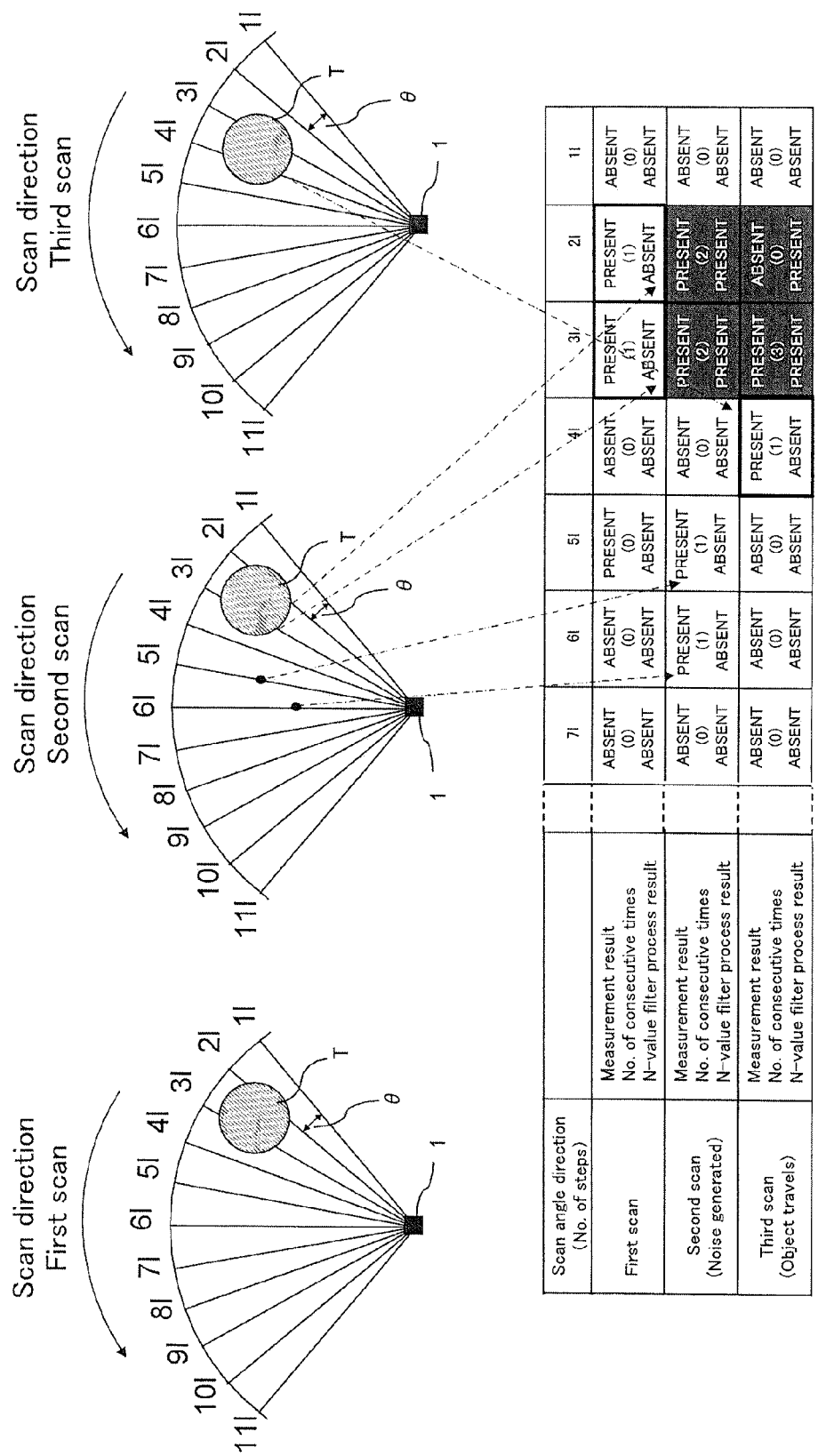
FIG. 12 is an explanatory view according to a different embodiment, showing an object detected by a scanning-type distance measurement device and an obstacle determination process performed by a signal processing device.

As shown in FIG. 12, according to the sixth condition, the "N-value filter process result" column of the scan angle direction 2l at the third scan changes from "absent" to "present" so as to satisfy the third condition, and it is thus determined that there is the to-be-monitored object in the scan angle directions 2l and 3l. In other words, the sixth condition also corresponds to the process of expanding an object in the scan direction in order to avoid thinning of the object travelling in the scan direction of measurement light.

Figure 13:
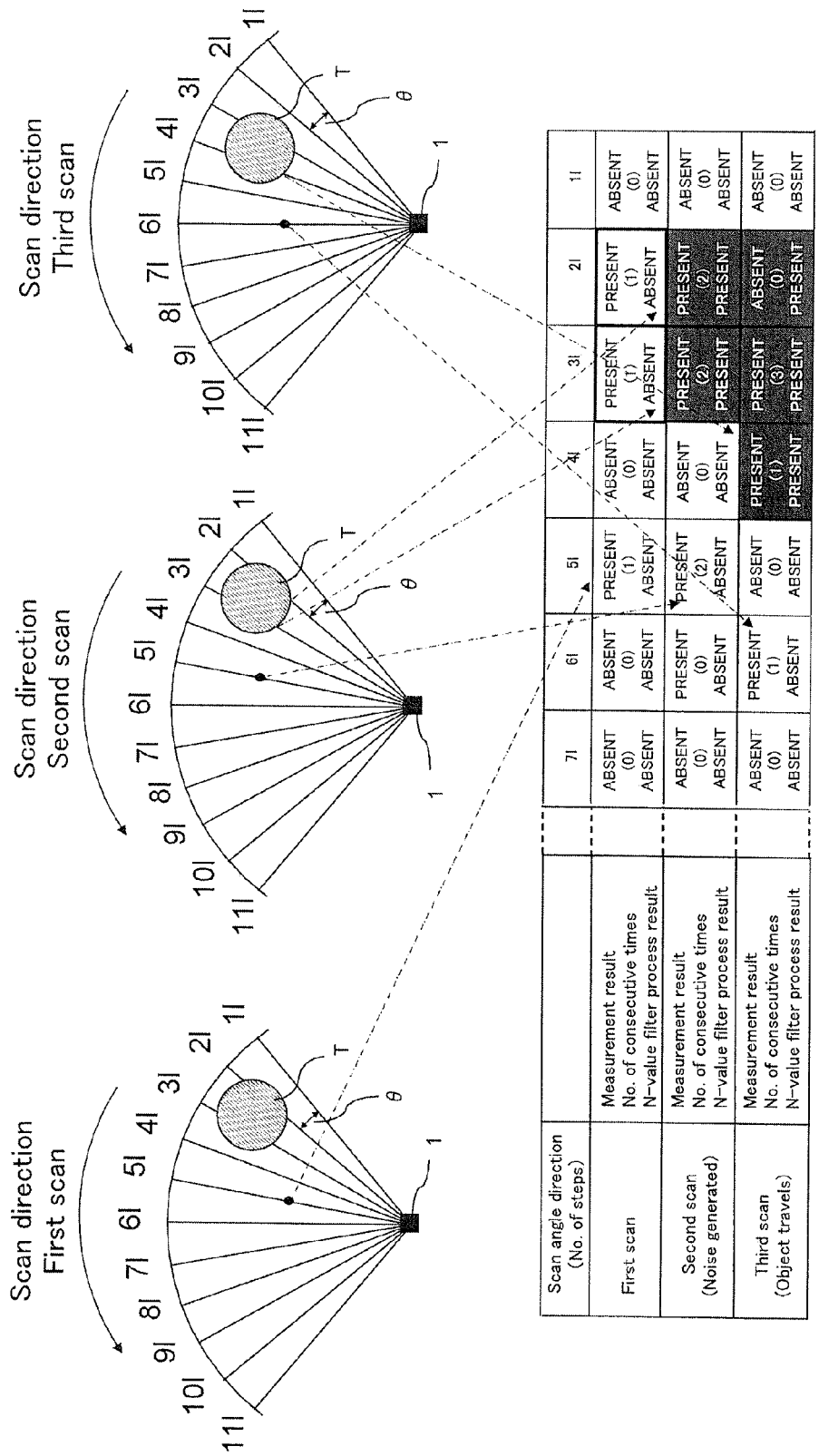
FIG. 13 is an explanatory view according to a different embodiment, showing an object detected by a scanning-type distance measurement device and an obstacle determination process performed by a signal processing device.

FIG. 13 shows a case where the to-be-monitored object determination unit 231 adopts both of the fifth and sixth conditions described above.

Furthermore, the number of scans N is preferably set to a different value depending on a distance to an object calculated by the distance calculation unit 230 or the size of the to-be-monitored object.

Specifically, when the distance calculation unit 230 calculates a short distance, the number of scans N is set to a value smaller than that of a case where the calculated distance is long. When the to-be-monitored object is small, the number of scans N is set to a value smaller than that of a case where the to-be-monitored object is large. It is thus possible to improve determination accuracy in accordance with a state.

Moreover, the number of adjacent scan angle directions M is preferably set to a different value depending on a distance calculated by the distance calculation unit 230.

Specifically, when the distance calculation unit 230 calculates a short distance, the number of adjacent scan angle directions M is set to a value larger than that of a case where the calculated distance is long. It is thus possible to improve determination accuracy in accordance with a state.

Returning to FIG. 3, the to-be-monitored object determination unit 231 includes a scan angle/distance storage unit 23d, an object detection history storage unit 23e, an N-value filter storage unit 23f, a to-be-monitored region setting unit 23g, a region determination processing unit 23h, an N-value filter processing unit 23i, a data recovery processing unit 23j, and a minimum detected object determination processing unit 23k.

The to-be-monitored region setting unit 23g includes a memory storing region data that defines a boundary of the to-be-monitored region as a monitoring target of the scanning-type distance measurement device 1. The region data is transmitted from the external device, which is connected to the system control unit 24, through the system control unit 24, and is preliminarily stored in the memory.

The scan angle/distance storage unit 23d stores a scan angle and a distance for an object calculated by the distance calculation unit 230. The object detection history storage unit 23e stores a result of a process performed by the region determination processing unit 23h. The N-value filter storage unit 23f stores a result of a process performed by the N-value filter processing unit 23i and the stored value is updated by the data recovery processing unit 23j.

Figure 5:
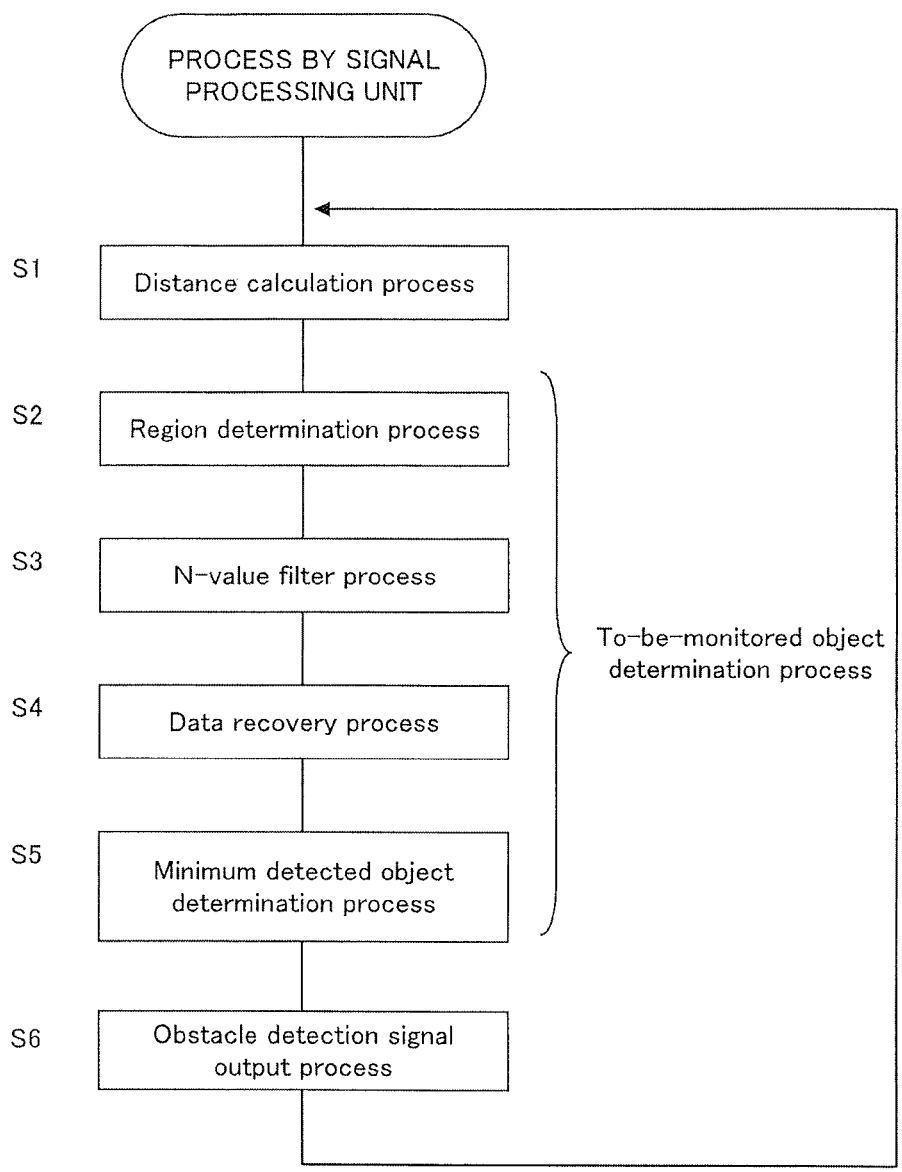
FIG. 5 is a flowchart illustrating entire processes performed by the signal processing device.

As shown in FIG. 5, the signal processing unit 23 and the system control unit 24 configure the signal processing device according to the present invention. In the signal processing device, the distance calculation unit 230 performs a distance calculation process (S1) as described above. In accordance with the result, the region determination processing unit 23h performs a region determination process (S2), the N-value filter processing unit 23i performs an N-value filter process (S3), the data recovery processing unit 23j performs a data recovery process (S4), the minimum detected object determination processing unit 23k performs a minimum detected object determination process (S5), and the system control unit 24 performs an obstacle detection signal output process (S6).

Figure 6:
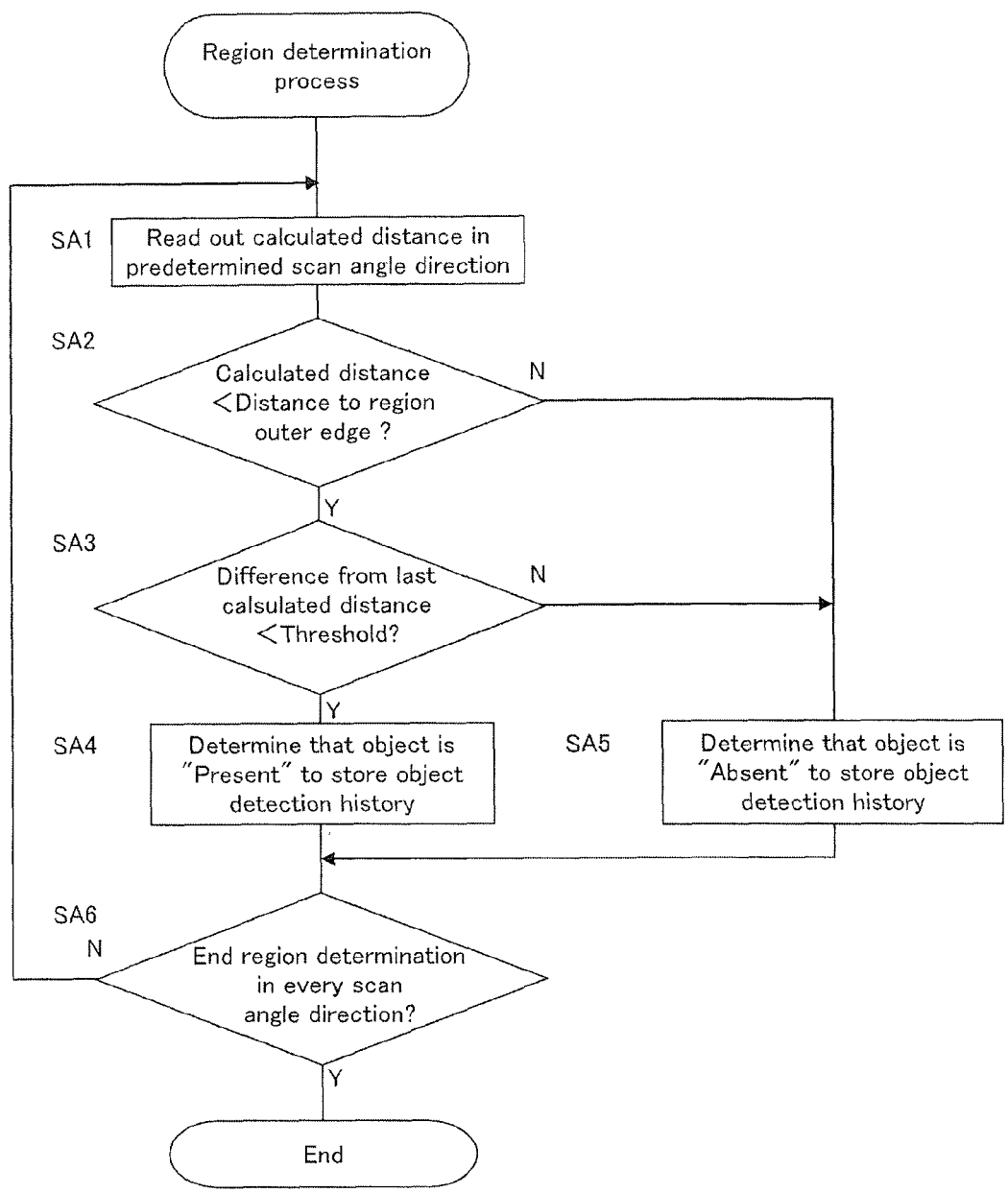
FIG. 6 is a flowchart illustrating a region determination process.

As shown in FIG. 6, in the region determination process performed by the region determination processing unit 23h, a scan angle and a distance in a scan direction are sequentially read out of the scan angle/distance storage unit 23d (SA1), and it is then determined whether or not the calculated distance is shorter than a distance to a region outer edge of the to-be-monitored region set by the to-be-monitored region setting unit 23g (SA2).

If the distance calculated by the distance calculation unit 230 is equal to or longer than the distance to the region outer edge (SA2, N), it is determined that an object is "absent" and the value is stored in the object detection history storage unit 23e (SA5). If the distance calculated by the distance calculation unit 230 is shorter than the distance to the region outer edge (SA2, Y), it is determined whether or not a difference from the last calculated distance is smaller than the predetermined threshold (SA3).

If the difference from the last calculated distance is equal to or greater than the predetermined threshold (SA3, N), it is determined that an object is "absent" because the object detected the last time is different from the object detected this time, and the value is stored in the object detection history storage unit 23e (SA5). If the difference from the last calculated distance is smaller than the predetermined threshold (SA3, Y), it is determined that an object is "present" and the value is stored in the object detection history storage unit 23e (SA4). These process steps are performed in every scan angle direction for each scan cycle (SA6). In other words, the region determination processing unit 23h performs the process corresponding to the second condition.

Figure 7:
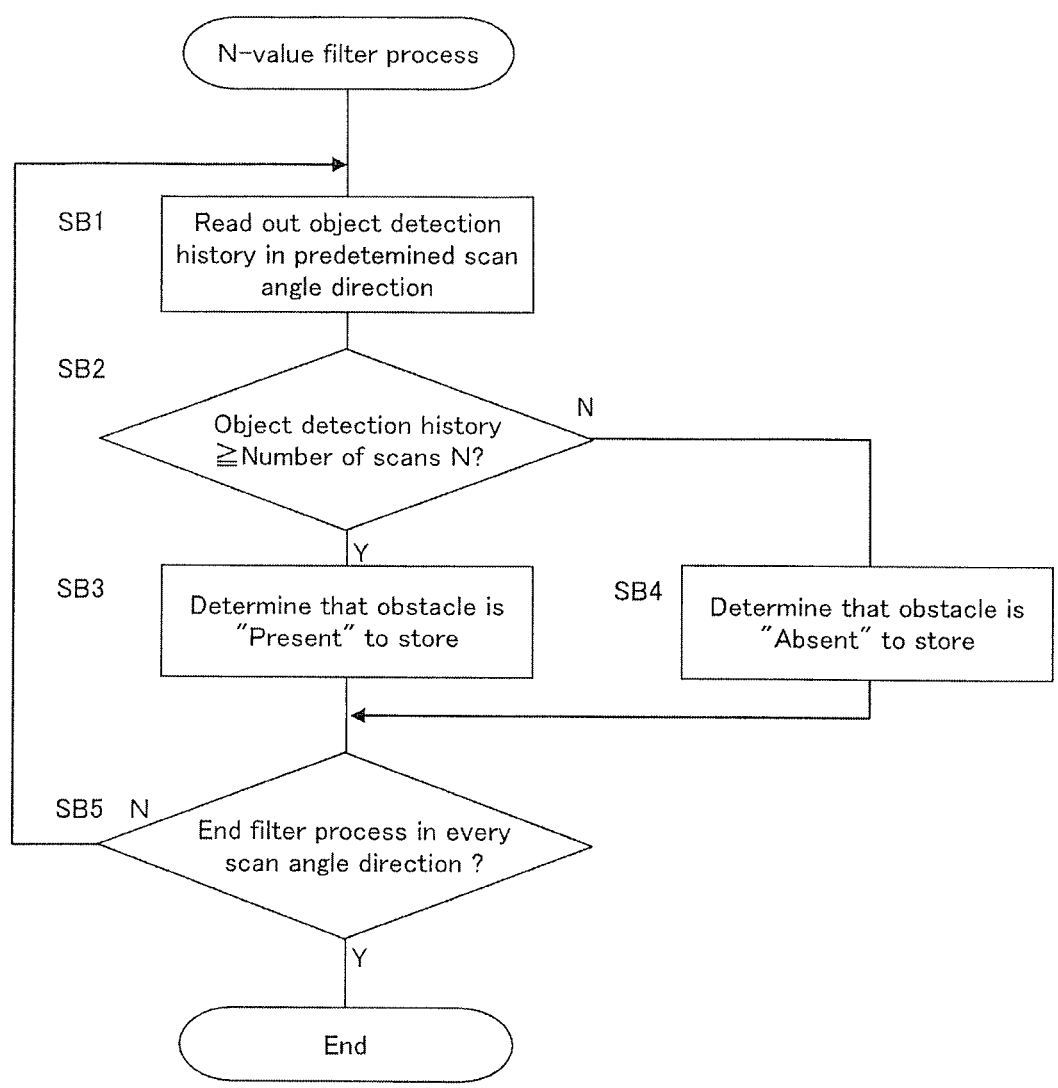
FIG. 7 is a flowchart illustrating an N-value filter process.

As shown in FIG. 7, in the N-value filter process performed by the N-value filter processing unit 23i, an object detection history in a scan direction is sequentially read out of the object detection history storage unit 23e (SB1) and it is determined whether or not an object is determined as being "present" consecutively for the N number of scans in each scan angle direction (SB2).

If it is not determined that an object is "present" consecutively for the N number of scans in a specific scan angle direction (SB2, N), it is determined that an obstacle is "absent" in the scan angle direction and the result is stored in the N-value filter storage unit 23f (SB4). If it is determined that an object is "present" consecutively for the N number of scans in the specific scan angle direction (SB2, Y), it is determined that an obstacle is "present" in the scan angle direction and the result is stored in the N-value filter storage unit 23f (SB3).

These process steps are performed in every scan angle direction for each scan cycle (SB5). In other words, the N-value filter processing unit 23i performs the process corresponding to the first condition. The N-value filter process includes filtering by removing data generated by disturbance and lasting for a short period of time.

Figure 8:
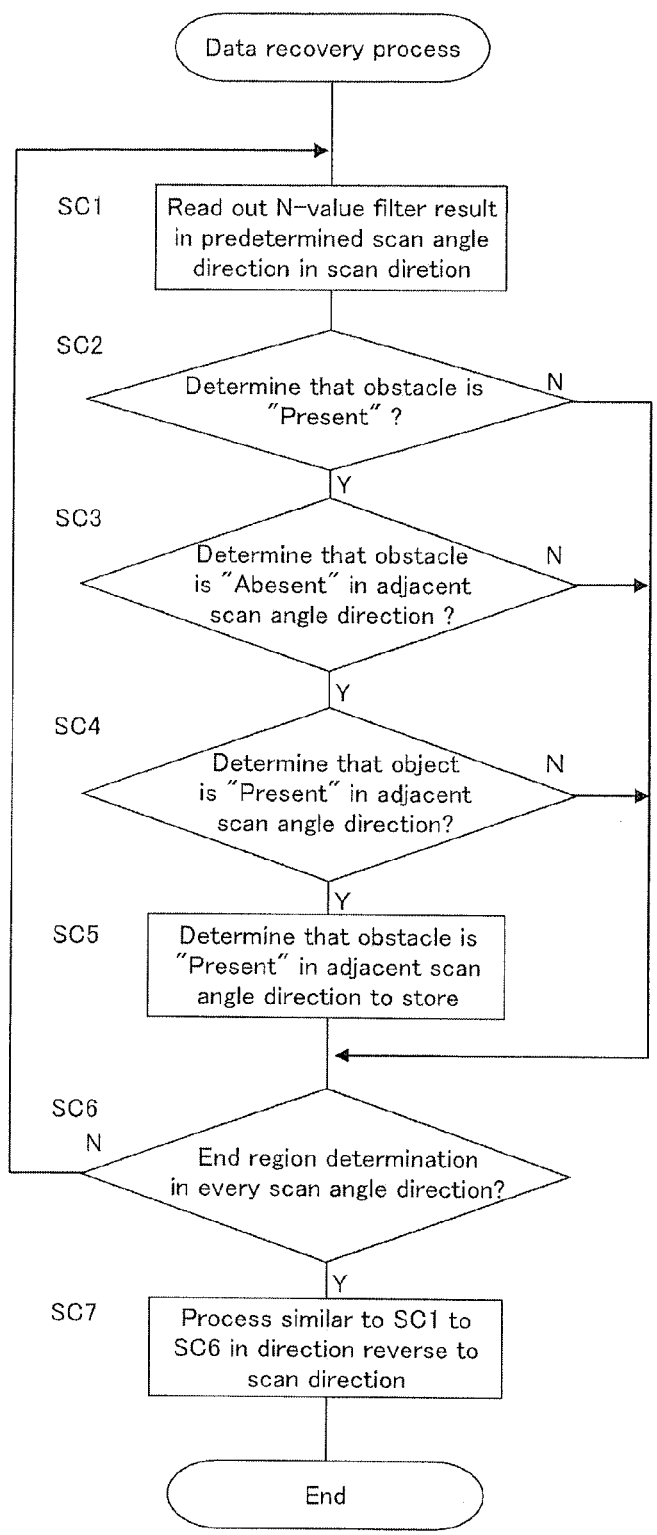
FIG. 8 is a flowchart illustrating a data recovery process.

As shown in FIG. 8, in the data recovery process performed by the data recovery processing unit 23j, initially, an N-value filter result in a scan direction is sequentially read out of the N-value filter storage unit 23f, and an object detection history in the scan direction is sequentially read out of the object detection history storage unit 23e (SC1).

Then, if it is determined that an obstacle is "present" as an N-value filter result in a specific scan angle direction (SC2), if it is determined that an obstacle is "absent" as an N-value filter result in a scan angle direction adjacent to the specific scan angle direction (SC3), and if it is determined that an object is "present" as the object detection history in the scan angle direction adjacent to the specific scan angle direction (S4), then it is determined that an obstacle is "present" in the scan angle direction adjacent to the specific scan angle direction and the result is overwritten in the N-value filter storage unit 23f.

If negative determination is made in step SC2, SC3, or SC4, there is performed no process and the procedure proceeds to step SC6. In step SC6, the process steps from steps SC1 to SC5 are performed in a scan direction of measurement light sequentially assuming each scan angle direction as being the specific scan angle direction. The process steps from steps SC1 to SC6 are then performed in a scan direction reverse to the scan direction of measurement light sequentially assuming each scan angle direction as being the specific scan angle direction. In other words, the data recovery processing unit 23j performs the process corresponding to the fifth condition.

Figure 9:
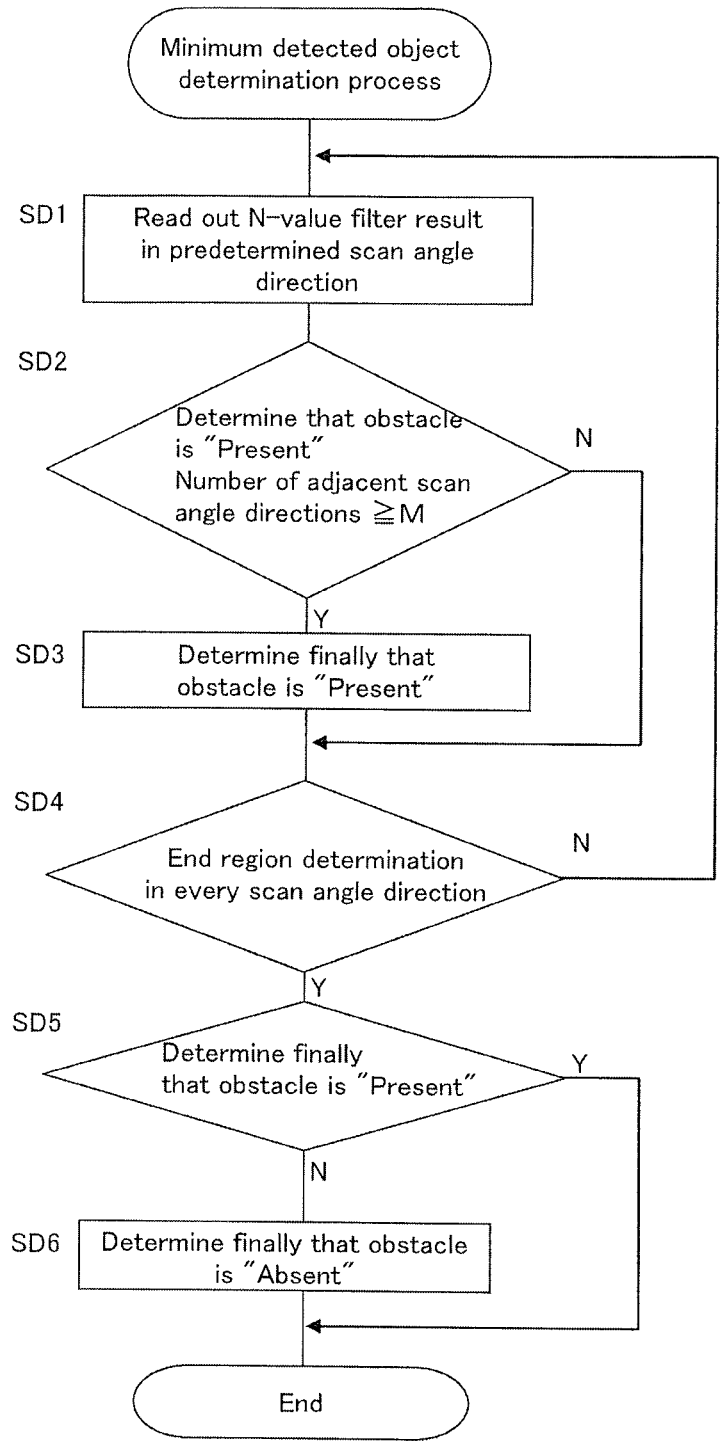
FIG. 9 is a flowchart illustrating a minimum detected object determination process.

As shown in FIG. 9, in the minimum detected object determination process performed by the minimum detected object determination processing unit 23k, after the data recovery process is performed, an N-value filter result in a scan direction is sequentially read out of the N-value filter storage unit 23f (SD1), and it is determined whether or not an obstacle is determined as being "present" in the M or more number of adjacent scan angle directions in the scan direction (SD2).

If it is determined that an obstacle is "present" in the M or more number (M=2 herein) of adjacent scan angle directions in the scan direction (SD2, Y), it is finally determined that an obstacle is "present" and the value is stored in the memory of the minimum detected object determination processing unit 23k (SD3).

When the final determination ends in every scan angle direction in the scan direction (SD4), it is determined whether or not the memory stores any data of final determination that an obstacle is "present". If the memory stores no data of final determination that an obstacle is "present" (SD5), it is finally determined that an obstacle is "absent" and the value is stored in the memory (SD6). In other words, the minimum detected object determination processing unit 23k performs the process corresponding to the third condition.

Figure 11:
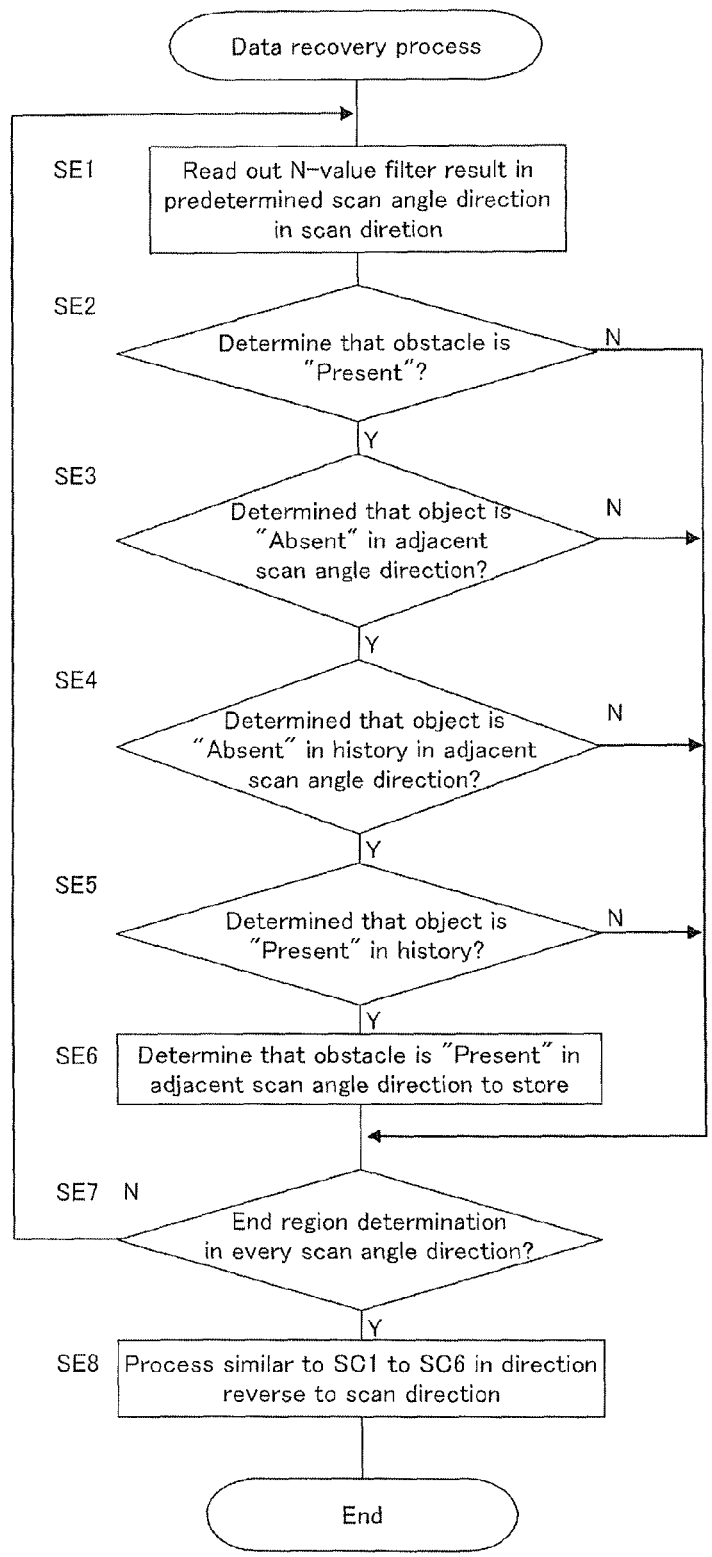
FIG. 11 is a flowchart illustrating a data recovery process according to a different embodiment.

FIG. 11 shows a different example of the data recovery process performed by the data recovery processing unit 23j. This process corresponds to the sixth condition.

Initially, an N-value filter result in a scan direction is sequentially read out of the N-value filter storage unit 23f, and an object detection history in the scan direction is sequentially read out of the object detection history storage unit 23e (SE1).

Then, if it is determined that an obstacle is "present" as an N-value filter result in a specific scan angle direction (SE2), if it is determined that an obstacle is "absent" as an N-value filter result in a scan angle direction adjacent to the specific scan angle direction (SE3), and if it is determined that an object is "absent" as the object detection history in the adjacent scan angle direction (SE4), determination is made on an object detection history from the object detection history storage unit 23e in the adjacent scan angle direction at a past scan (SE5).

The object detection history at the past scan indicates the object detection history at the last scan. If it is determined that an object is "present" as the object detection history at the last scan (SE5), it is determined that an obstacle is "present" in the scan angle direction adjacent to the specific scan angle direction and the result is overwritten in the N-value filter storage unit 23f (SE6).

As the object detection history at the past scan, it is possible to use object detection histories in the adjacent scan angle direction at a plurality of scans where it is consecutively determined that an obstacle is "present" in the specific scan angle direction, and the process step in step SE6 can be performed if it is determined that an object is "present" as any of the object detection histories in the adjacent scan angle direction at the plurality of scans. Steps SE7 and SE8 are similar to steps SC6 and SC7 in FIG. 8.

In the embodiment described above, the to-be-monitored object determination unit 231 performs the N-value filter process of determining whether or not a distance within the to-be-monitored region is calculated consecutively for the N number of scans in the specific scan angle direction and then performs the minimum detected object determination process of determining whether or not a distance within the to-be-monitored region is calculated in the M number of adjacent specific scan angle directions. Alternatively, the to-be-monitored object determination unit 231 can initially perform the minimum detected object determination process of determining whether or not an object is detected in the M number of adjacent scan angle directions in accordance with a result of the region determination process stored in the object detection history storage unit and then perform the N-value filter process of determining whether or not a distance within the to-be-monitored region is calculated consecutively for the N number of scans in the specific scan angle direction in accordance with the result of the minimum detected object determination process.

In this case, in the signal processing device, the distance calculation unit 230 performs the distance calculation process. In accordance with the result, the region determination processing unit 23h performs the region determination process, and the minimum detected object determination processing unit 23k performs the minimum detected object determination process. In accordance with the result, the N-value filter processing unit 23i performs the N-value filter process, and the system control unit 24 performs the obstacle detection signal output process.

When an object travels in the to-be-monitored region, as a result of the minimum detected object determination process, even though a distance is calculated in the M number of adjacent scan angle directions, if a scan angle direction is shifted so as to be never superposed on the object from the last scan to the current scan, an obstacle is never detected in the N-value filter process.

In this case, a predetermined correction process can be performed prior to the N-value filter process. The correction process can include, as a result of the minimum detected object determination process, forcibly determining that an object is "present" in P number of scan angle directions (P is a natural number) adjacent to the M number of scan angle directions in which a distance is calculated consecutively so as to expand the object in the scan direction.

The value P can be set appropriately. The object can be expanded to both sides of the M number of adjacent scan angle directions, or can be expanded only to one of the sides. In the latter case, it is preferred that a travel direction of the object is obtained from distances calculated by the distance calculation unit 230 at a plurality of past scans and the object is expanded in the travel direction.

The above embodiment exemplifies the signal processing device of a scanning-type distance measurement device, the signal processing method, and the scanning-type distance measurement device according to the present invention. It is obviously possible to appropriately modify in design the specific structure of the scanning-type distance measurement device, the specific circuit configuration of the signal processing device, the specific procedure of software embodying the signal processing method, and the like, within the scope of exerting the functional effects of the present invention. The technical scope of the present invention is not limited to the example described above.

DESCRIPTION OF SYMBOLS

1: Scanning-type distance measurement device
3: Light emission unit
5: Light reception unit
4: Scan unit
23: Signal processing unit (Signal processing device)
23a: Distance measurement operation unit
23b: Correction processing unit
23c: Correction data storage unit
23d: Scan angle/distance storage unit
23e: Object detection history storage unit
23f: N-value filter storage unit
23g: To-be-monitored region setting unit
23h: Region determination processing unit
23i: N-value filter processing unit
23j: Data recovery processing unit
23k: Minimum detected object determination processing unit
24: System control unit (Signal processing device)
230: Distance calculation unit (Signal processing device)
231: Obstacle determination unit (Signal processing device)

The invention claimed is:

1. A signal processing device of a scanning-type distance measurement device repetitively scanning, with use of measurement light, a to-be-monitored region partitioned within a predetermined separation distance at predetermined scan cycles to detect reflected light from an object of the measurement light at each predetermined scan angle, the signal processing device comprising:
   a distance calculation unit configured to calculate a distance from the scanning-type distance measurement device to the object at each predetermined scan angle in accordance with delay time and/or a phase difference between measurement light and reflected light;
   a to-be-monitored object determination unit configured to perform a to-be-monitored object determination process of determining that there is a to-be-monitored object in a specific scan angle direction when the distance calculation unit calculates a distance within the to-be-monitored region consecutively for N number of scans in the specific scan angle direction, N being an integer equal to or greater than two;
   a signal output unit configured to output a to-be-monitored object detection signal when the to-be-monitored object determination unit determines that there is the to-be-monitored object; and wherein, at the N-th scan where the distance calculation unit calculates a distance within the to-be-monitored region consecutively for the N number of scans in the specific scan angle direction, when a distance within the to-be-monitored region is calculated in M number of adjacent scan angle directions including the specific scan angle direction at any of a current or last scan, the to-be-monitored object determination unit determines that there is the to-be-monitored object in the specific scan angle directions, M being an integer equal to or greater than two.

2. The signal processing device of a scanning-type distance measurement device according to claim 1, wherein the to-be-monitored object determination unit calculates a difference between distances calculated by the distance calculation unit for two consecutive scans in the specific scan angle direction, and performs the to-be-monitored object determination process when the calculated value is smaller than a predetermined threshold set in accordance with a possible travel distance of the to-be-monitored object in the single scan cycle.

3. The signal processing device of a scanning-type distance measurement device according to claim 1, wherein, when there are M number of adjacent specific scan angle directions in which a distance within the to-be-monitored region is calculated by the distance calculation unit consecutively for the N number of scans, the to-be-monitored object determination unit determines that there is the to-be-monitored object in the specific scan angle directions.

4. The signal processing device of a scanning-type distance measurement device according to claim 1, wherein, at the N-th scan where the distance calculation unit calculates a distance within the to-be-monitored region consecutively for the N number of scans in the specific scan angle direction, when a distance within the to-be-monitored region is calculated in M number of adjacent scan angle directions including the specific scan angle direction, the to-be-monitored object determination unit determines that there is the to-be-monitored object in the specific scan angle directions.

5. A signal processing device of a scanning-type distance measurement device repetitively scanning, with use of measurement light, a to-be-monitored region partitioned within a predetermined separation distance at predetermined scan cycles to detect reflected light from an object with respect to the measurement light at each predetermined scan angle, the signal processing device comprising:

a distance calculation unit configured to calculate a distance from the scanning-type distance measurement device to the object at the each predetermined scan angle in accordance with delay time and/or a phase difference between measurement light and reflected light;

a to-be-monitored object determination unit configured to perform a to-be-monitored object determination process of determining that there is a to-be-monitored object in M number of adjacent scan angle directions when the distance calculation unit calculates a distance within the to-be-monitored region in each of the M number of scan angle directions, M being an integer equal to or greater than two and calculates a distance within the to-be-monitored region consecutively for N number of scans in each of the M number of scan angle directions, N being an integer equal to or greater than two; and a signal output unit configured to output a to-be-monitored object detection signal when the to-be-monitored object determination unit determines that there is the to-be-monitored object.

6. The signal processing device of a scanning-type distance measurement device according to claim 1, wherein the number of scans N is set to a different value depending on a distance calculated by the distance calculation unit or a size of the to-be-monitored object.

7. The signal processing device of a scanning-type distance measurement device according to claim 3, wherein the number of adjacent scan angle directions M is set to a different value depending on a distance calculated by the distance calculation unit.

8. A scanning-type distance measurement device repetitively scanning, with use of measurement light, a to-be-monitored region partitioned within a predetermined separation distance at predetermined scan cycles to detect reflected light from an object with respect to the measurement light at each predetermined scan angle, the scanning-type distance measurement device comprising a signal processing device including:

a distance calculation unit configured to calculate a distance from the scanning-type distance measurement device to the object at each predetermined scan angle in accordance with delay time and/or a phase difference between measurement light and reflected light;

a to-be-monitored object determination unit configured to perform a to-be-monitored object determination process of determining that there is a to-be-monitored object in a specific scan angle direction when the distance calculation unit calculates a distance within the to-be-monitored region consecutively for N number of scans in the specific scan angle direction, N being an integer equal to or greater than two;

a signal output unit configured to output a to-be-monitored object detection signal when the to-be-monitored object determination unit determines that there is the to-be-monitored object; and wherein, at the N-th scan where the distance calculation unit calculates a distance within the to-be-monitored region consecutively for the N number of scans in the specific scan angle direction, when a distance within the to-be-monitored region is calculated in M number of adjacent scan angle directions including the specific scan angle direction at any of a current or last scan, the to-be-monitored object determination unit determines that there is the to-be-monitored object in the specific scan angle directions, M being an integer equal to or greater than two.

9. A signal processing method for a scanning-type distance measurement device repetitively scanning, with use of measurement light, a to-be-monitored region partitioned within a predetermined separation distance at predetermined scan cycles to detect reflected light from an object with respect to the measurement light at each predetermined scan angle, the signal processing method comprising:

a distance calculation step of calculating a distance from the scanning-type distance measurement device to the object at each predetermined scan angle in accordance with delay time and/or a phase difference between measurement light and reflected light;

a to-be-monitored object determination step of performing a to-be-monitored object determination process of determining that there is a to-be-monitored object in a specific scan angle direction when a distance within the to-be-monitored region is calculated consecutively for N number of scans in the specific scan angle direction in the distance calculation step, N being an integer equal to or greater than two;

a signal output step of outputting a to-be-monitored object detection signal when the to-be-monitored object determination step determines that there is the to-be-monitored object; and wherein, at the N-th scan where a distance within the to-be-monitored region is calculated in the distance calculation step consecutively for the N number of scans in the specific scan angle direction, when a distance within the to-be-monitored region is calculated in M number of adjacent scan angle directions including the specific scan angle direction at any of a current or last scan, the to-be-monitored object determination step includes determining that there is the to-be-monitored object in the specific scan angle directions, M being an integer equal to or greater than two.

10. The signal processing method for a scanning-type distance measurement device according to claim 9, wherein the to-be-monitored object determination step includes performing the to-be-monitored object determination process when a difference between distances calculated in the distance calculation step for two consecutive scans in the specific scan angle direction is smaller than a predetermined threshold set in accordance with a possible travel distance of the to-be-monitored object in the single scan cycle.

11. The signal processing method for a scanning-type distance measurement device according to claim 9, wherein, when there are M number of adjacent specific scan angle directions (M is an integer equal to or greater than two) in which a distance within the to-be-monitored region is calculated in the distance calculation step consecutively for the N number of scans, the to-be-monitored object determination step includes determining that there is the to-be-monitored object in the specific scan angle directions.

12. The signal processing method for a scanning-type distance measurement device according to claim 9, wherein, at the N-th scan where a distance within the to-be-monitored region is calculated in the distance calculation step consecutively for the N number of scans in the specific scan angle direction, when a distance within the to-be-monitored region is calculated in M number of adjacent scan angle directions (M is an integer equal to or greater than two) including the specific scan angle direction, the to-be-monitored object determination step includes determining that there is the to-be-monitored object in the specific scan angle directions.

13. A signal processing method for a scanning-type distance measurement device repetitively scanning, with use of measurement light, a to-be-monitored region partitioned within a predetermined separation distance at predetermined scan cycles to detect reflected light from an object with respect to the measurement light at each predetermined scan angle, the signal processing method comprising:

a distance calculation step of calculating a distance from the scanning-type distance measurement device to the object at the each predetermined scan angle in accordance with delay time and/or a phase difference between measurement light and reflected light;

a to-be-monitored object determination step of performing a to-be-monitored object determination process of determining that there is a to-be-monitored object in M number of adjacent scan angle directions when a distance within the to-be-monitored region is calculated in each of the M number of scan angle directions, M being an integer equal to or greater than two, and a distance within the to-be-monitored region is calculated consecutively for N number of scans in each of the M number of scan angle directions in the distance calculation step, N being an integer equal to or greater than two; and a signal output step of outputting a to-be-monitored object detection signal when it is determined that there is the to-be-monitored object in the to-be-monitored object determination step.

* * * * *